US010884136B2

(12) United States Patent
Anderson et al.

(10) Patent No.: US 10,884,136 B2
(45) Date of Patent: Jan. 5, 2021

(54) EFFICIENT DETECTION OF RANGING CODE CORRELATION FUNCTION OF A GNSS SIGNAL

(71) Applicant: Imagination Technologies Limited, Kings Langley (GB)

(72) Inventors: Adrian John Anderson, Chepstow (GB); Peter Bagnall, Bath (GB)

(73) Assignee: Imagination Technologies Limited, Kings Langley (GB)

( * ) Notice: Subject to any disclaimer, the term of this patent is extended or adjusted under 35 U.S.C. 154(b) by 294 days.

(21) Appl. No.: 15/974,869

(22) Filed: May 9, 2018

(65) Prior Publication Data
US 2018/0329072 A1 Nov. 15, 2018

(30) Foreign Application Priority Data

May 9, 2017 (GB) .................................. 1707429.5

(51) Int. Cl.
*G01S 19/30* (2010.01)
*G01S 19/22* (2010.01)
(Continued)

(52) U.S. Cl.
CPC .............. *G01S 19/30* (2013.01); *G01S 19/22* (2013.01); *G01S 19/243* (2013.01); *G01S 19/254* (2013.01)

(58) Field of Classification Search
CPC ........ G01S 19/30; G01S 19/22; G01S 19/243; G01S 19/254; G01S 19/29; G01S 19/32; G01S 19/34; G01S 19/24
(Continued)

(56) References Cited

U.S. PATENT DOCUMENTS 7,952,396 B1 * 5/2011 Hunter .................. G06F 1/0321
327/106
2004/0057505 A1   3/2004 Valio
(Continued)

FOREIGN PATENT DOCUMENTS

EP    3104195 A1   12/2016
WO   01/35525 A1    5/2001
(Continued)

OTHER PUBLICATIONS

Examination Report dated Feb. 20, 2020 in European Application No. 18171306.6.

*Primary Examiner* — Harry K Liu
(74) *Attorney, Agent, or Firm* — Potomac Law Group, PLLC; Vincent M DeLuca

(57) ABSTRACT

A ranging code correlation function detection system for use in a global navigation satellite system (GNSS) receiver includes a correlation block to correlate a digitized GNSS signal (e.g. at or above a critical sampling rate) with a corresponding ranging code at each of a plurality of different offsets from a current estimate of a code delay to generate a plurality of correlation data points; an interpolation filter configured to generate at least one estimated correlation data point that lies between two of the correlation data points based on the current estimate of the code delay. In some cases the ranging code correlation function detection system may also include a discriminator block configured to generate an updated estimate of the code delay based on the at least one estimated correlation data point.

19 Claims, 17 Drawing Sheets

(51) Int. Cl.
  *G01S 19/24* (2010.01)
  *G01S 19/25* (2010.01)
(58) Field of Classification Search
  USPC .................................................. 342/357.69
  See application file for complete search history.

(56) References Cited

U.S. PATENT DOCUMENTS

| | | | |
|---|---|---|---|
| 2006/0125690 A1 | 6/2006 | Goren et al. | |
| 2007/0008195 A1* | 1/2007 | Jin | H04L 7/042 |
| | | | 341/61 |
| 2009/0180524 A1 | 7/2009 | Wang et al. | |
| 2009/0213912 A1* | 8/2009 | Brenner | G01S 19/22 |
| | | | 375/150 |
| 2011/0193744 A1* | 8/2011 | Warloe | G01S 19/36 |
| | | | 342/357.73 |
| 2012/0026039 A1* | 2/2012 | Ganeshan | G01S 19/37 |
| | | | 342/357.73 |
| 2012/0062426 A1 | 3/2012 | Rocker | |
| 2013/0058432 A1* | 3/2013 | Futatsugi | H04J 11/0036 |
| | | | 375/296 |
| 2013/0229305 A1* | 9/2013 | Nayyar | G01S 19/30 |
| | | | 342/357.63 |
| 2014/0070987 A1* | 3/2014 | Jarvis | G01S 19/258 |
| | | | 342/357.21 |
| 2015/0243293 A1* | 8/2015 | Nagel | G10L 19/00 |
| | | | 704/500 |
| 2016/0277007 A1* | 9/2016 | Tangudu | H03H 11/04 |
| 2016/0327652 A1* | 11/2016 | Macleod | G01S 19/30 |
| 2017/0242128 A1* | 8/2017 | Lennen | G01S 19/29 |
| 2018/0231666 A1* | 8/2018 | Lennen | G01S 19/22 |

FOREIGN PATENT DOCUMENTS

| | | |
|---|---|---|
| WO | 2003005055 A1 | 1/2003 |
| WO | 2003036322 A2 | 5/2003 |
| WO | 2004036239 A2 | 4/2004 |
| WO | 2008/067397 A2 | 6/2008 |

* cited by examiner (A)

(B)

EFFICIENT DETECTION OF RANGING CODE CORRELATION FUNCTION OF A GNSS SIGNAL

BACKGROUND

A Global Navigation Satellite System (GNSS) is a constellation of orbiting satellites transmitting signals encoded with positioning and timing data that allow a GNSS receiver to determine its position, velocity, and precise time (PVT) by processing signals from satellites in view. Example GNSSs include the USA's Global Positioning System (GPS), the Russian Federation's Global Orbiting Navigation Satellite System (GLONASS), China's BeiDou Navigation Satellite System (BeiDou), Europe's Galileo, and satellite-based augmentation systems (SBAS), such as Europe's European Geostationary Navigation Overlay Service (EGNOS).

In order to process a received GNSS signal a GNSS receiver must synchronize with the received signal. To enable synchronization therewith GNSS signals are modulated with a ranging code (which may also be referred to as a Pseudo-Random Noise (PRN) code or a PRN sequence). The ranging code may be unique to each satellite in the GNSS (such as in GPS) or may be common to all satellites in the GNSS (such as in GLONASS). A GNSS receiver synchronizes to a received signal by correlating the received signal with a local replica of the corresponding ranging code to detect the ranging code correlation function of the GNSS signal. The Doppler frequency and the code delay to shift the local replica of the local replica of the corresponding ranging code can be determined from the ranging code correlation function and used to adjust the local replica of the ranging code, to ensure that the local replica of the ranging code is aligned with the received GNSS signal.

Accordingly, a key operation of a GNSS receiver is detecting the ranging code correlation function of the received GNSS signal. However, known hardware implementations (e.g. integrated circuits) to detect the ranging code correlation function are complex, take up a significant amount of silicon area, and consume a significant amount of power.

The embodiments described below are provided by way of example only and are not limiting of implementations which solve any or all of the disadvantages of known methods or GNSS receivers for detecting the ranging code correlation function of a GNSS signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are ranging code correlation function detection systems for use in a global navigation satellite system (GNSS) receiver that include: a correlation block to correlate a digitized GNSS signal with a corresponding ranging code at each of a plurality of different offsets from a current estimate of a code delay to generate a plurality of correlation data points; and an interpolation filter configured to generate at least one estimated correlation data point that lies between two of the correlation data points based on the current estimate of the code delay. In some examples the at least one estimated correlation data point is provided to a code discriminator to generate an updated estimate of the code delay based on the at least one estimated correlation data point.

A first aspect provides a ranging code correlation function detection system for use in a global navigation satellite system "GNSS" receiver comprising: a correlation block configured to correlate a digitized GNSS signal with a corresponding ranging code at each of a plurality of different offsets from a current estimate of a code delay to generate a plurality of correlation data points; and an interpolation filter configured to generate at least one estimated correlation data point that lies between two of the correlation data points based on the current estimate of the code delay.

A second aspect provides a GNSS receiver comprising the ranging code correlation function detection system of the first aspect.

A third aspect provides a method of detecting a ranging code correlation function of a global navigation satellite system "GNSS" signal, the method comprising: receiving a digitized GNSS signal; correlating the digitized GNSS signal with a corresponding ranging code at each of a plurality of different offsets from a current estimate of a code delay to generate a plurality of correlation data points; and interpolating the correlation data points based on the current estimate of the code delay to generate at least one estimated correlation data point that lies between two of the correlation data points.

The digitized GNSS signal may be at a sampling rate greater than or equal to a critical sampling rate for the GNSS. The digitized GNSS signal may be at a sampling rate substantially equal to the critical sampling rate. The GNSS signal may be a CDMA GNSS signal and the critical sampling rate may be equal to a bandwidth of a main lobe of a frequency spectrum of the corresponding ranging code. The GNSS signal may be a GPS signal and the critical sampling rate may be substantially 2 MHz. The GNSS signal may be a Galileo signal and the critical sampling rate may be substantially 4 MHz. The GNSS signal may be a BeiDou signal and the critical sampling rate may be substantially 4 MHz. The critical sampling rate may correspond to two samples per chip of the ranging code or four samples per chip of the ranging code. The GNSS signal may be a GLONASS signal and the critical sampling rate may be substantially 9 MHz.

The method may further generate an updated estimate of the code delay based on the at least one estimated correlation data point. The method may further perform multipath mitigation on the digitized GNSS signal based on the at least one estimated correlation data point.

The interpolation filter may be a polyphase finite impulse response interpolation filter. The interpolation filter may be a farrow finite impulse response interpolation filter.

A fourth aspect provides a ranging code correlation function detection system configured to perform the method of the third aspect.

The ranging code correlation function detection system may be embodied in hardware on an integrated circuit. There may be provided a method of manufacturing, at an integrated circuit manufacturing system, a ranging code correlation function detection system. There may be provided an integrated circuit definition dataset that, when processed in an integrated circuit manufacturing system, configures the system to manufacture a ranging code correlation function detection system. There may be provided a non-transitory computer readable storage medium having stored thereon a computer readable description of an integrated circuit that, when processed, causes a layout processing system to generate a circuit layout description used in an integrated circuit manufacturing system to manufacture a ranging code correlation function detection system.

There may be provided an integrated circuit manufacturing system comprising: a non-transitory computer readable storage medium having stored thereon a computer readable integrated circuit description that describes the ranging code correlation function detection system; a layout processing system configured to process the integrated circuit description so as to generate a circuit layout description of an integrated circuit embodying the ranging code correlation function detection system; and an integrated circuit generation system configured to manufacture the ranging code correlation function detection system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
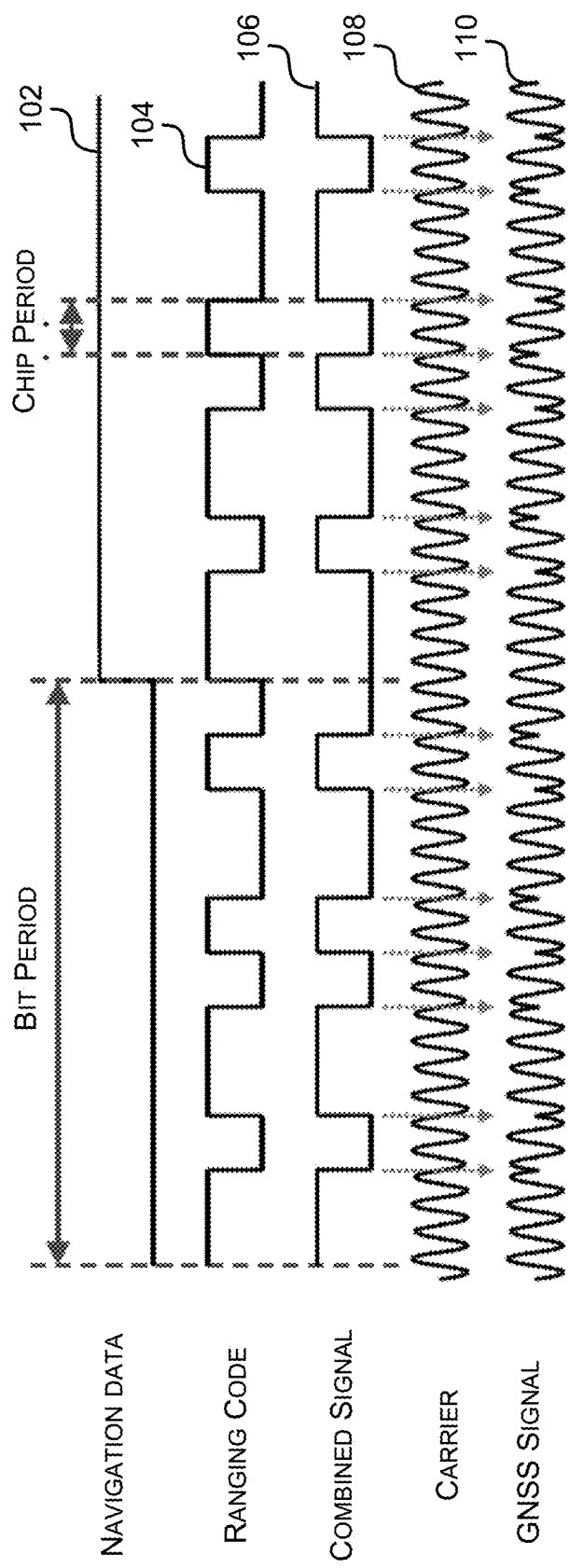
FIG. 1 is a schematic diagram of the composition of an example GNSS signal.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In most GNSSs the satellites (which may also be referred to as satellite vehicles (SVs)) are configured to transmit at the same carrier frequency. Accordingly, to enable signals transmitted from one satellite to be distinguished from signals transmitted by another satellite most GNSSs implement CDMA (carrier division multiple access) to multiplex several satellite signals onto the same frequency. As is known to those of skill in the art, CDMA is a spread spectrum multiple access technique in which the bandwidth of the data is spread uniformly for the same transmitted power using pseudo random spreading codes. In GNSSs that implement CDMA each satellite within the constellation is assigned a unique ranging code (which may also be referred to as a Pseudo-Random Noise (PRN) code or a PRN sequence) that the satellite uses to modulate all signals transmitted by that satellite.

Ranging codes are pseudo-random sequences of ones and zeros that have noise-like properties yet are reproducible according to an algorithm. Ranging codes have low cross correlation with other ranging codes and only have high auto-correlation at 0 lag (i.e. when perfectly aligned). There are a number of different ranging codes and the choice of ranging code is a trade-off between code length (the longer the code, the smaller the code cross-correlation properties and the higher number of codes can be generated, but the more time it takes to acquire the signal); code chip rate (the higher the chip rate the wider the signal bandwidth will be, but better ranging accuracies); and code characteristics (e.g. code characteristics that guarantee separation between satellites). Different GNSSs use different ranging codes. For example GPS L1 C/A used Gold codes that are combination of two maximum length codes, and Galileo uses tiered codes, a combination of a medium length primary code with a smaller length secondary code (such as memory codes).

Accordingly a GNSS signal comprises a carrier signal, navigation data, and a ranging code. The carrier is a signal at a frequency (generally in the L-band) dictated by the particular GNSS. For example, GPS L1 signals use a carrier of 1575.42 MHz. The navigation data is a binary-code message that provides information on the satellite ephemeris (i.e. data that tells the GNSS receiver where the specific GNSS satellite should be at any time throughout the day), clock bias parameters, almanac (i.e. data that describes the orbital course of every satellite in the GNSS), satellite health status, and other information. Each "1" or "0" of the navigation data is referred to as a bit, the duration of a bit is referred to as the bit duration or bit period, and the inverse of the bit duration is referred to as the bit rate. As described above, the ranging code is a deterministic sequence of zeros and ones, which has a spectrum similar to noise. Each "1" or "0" in the ranging code is referred to as a chip, the duration of a chip is referred to as the chip duration or chip period, and the inverse of the chip duration is referred to as the chip rate. The ranging code is designed to run at a much higher rate than the navigation data. In other words, the chip rate is higher than the bit rate. For example, in GPS the navigation data has a bit rate of 50 bits per second and the ranging code has a chip rate of 1.023 million chips per second which means that there are 20 chips per bit.

A GNSS signal is generated by combining the navigation data and the ranging code to generate a combined signal and modulating the carrier signal with the combined signal. For example, with reference to FIG. 1, the navigation data 102 may be combined, e.g., via a bitwise XOR (exclusive OR), with the ranging code 104 to produce a combined signal 106 which is used to modulate (e.g. via binary phase shift keying (BPSK)) the carrier signal 108 to produce a GNSS signal 110.

In some GNSSs the satellites may also be configured to transmit ranging codes without any navigation data. These so-called pilot signals may be useful in the acquisition and tracking process described in more detail below. The methods, systems and techniques described below for detecting the ranging code correlation function of a GNSS signal may detect the ranging code correlation function from a regular GNSS signal (a signal that includes navigation data and the ranging code); a pilot GNSS signal; or a combination of a regular signal and a pilot signal.

GNSS receivers are configured to process signals received from GNSS satellites to determine position, velocity, and precise time (PVT). As described above, in order to process the incoming GNSS signals a GNSS receiver must synchronize with the received signals. This involves correlating each received GNSS signal with a local replica of the corresponding ranging code, in order to determine the Doppler frequency and the code delay to shift and adjust the local replica of the ranging code, to ensure that the local replica of the ranging code is aligned with the received signal.

Figure 2:
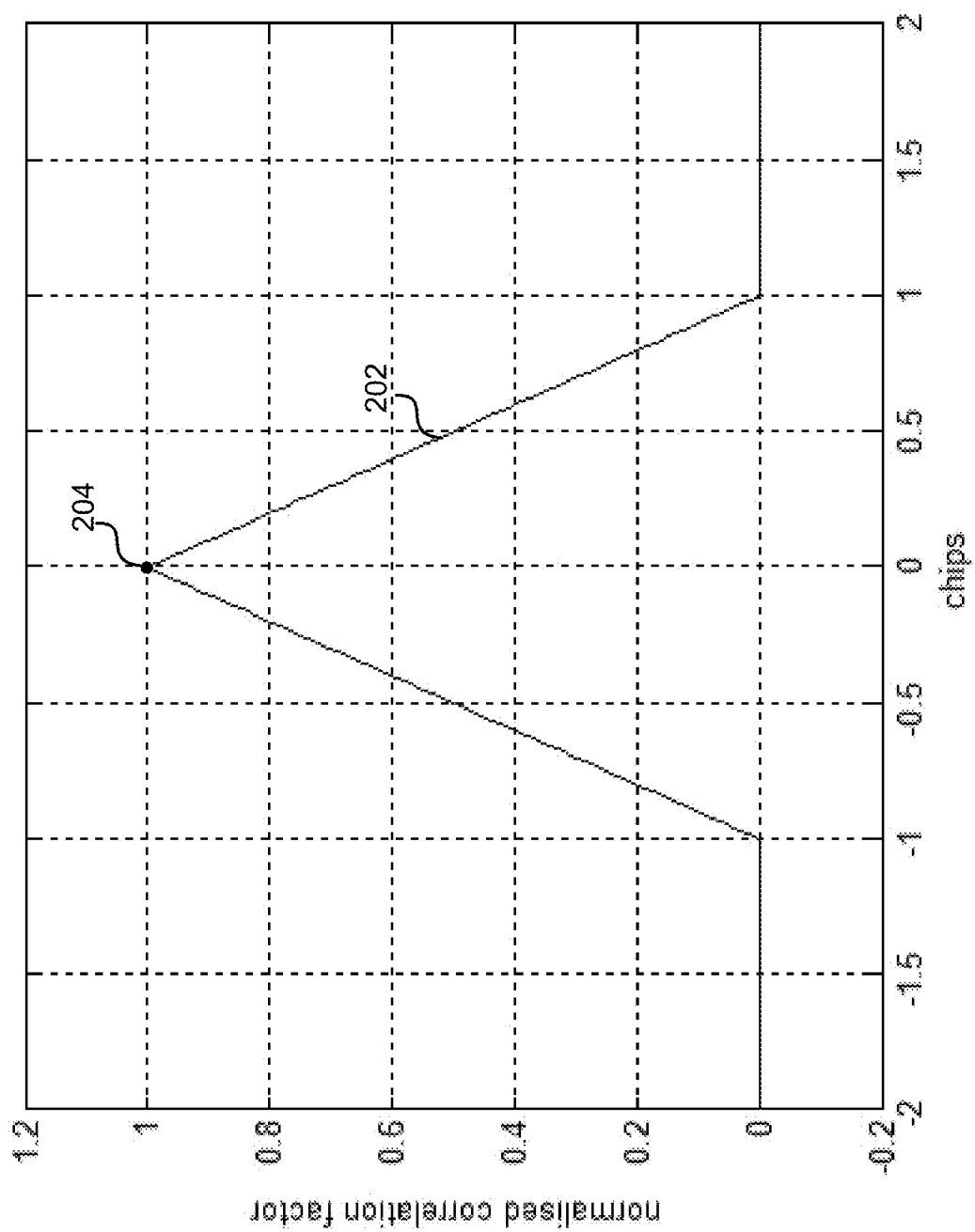
FIG. 2 is a graph of the auto-correlation function of a GPS ranging code with a 64 MHz bandwidth.

As described above, ranging codes have properties such that their auto-correlation function is at a maximum when they are completely aligned. For example, FIG. 2 illustrates the ranging code correlation function 202 of a 64 MHz sampled GPS ranging code. It can be seen from FIG. 2 that when the GPS ranging code is perfectly aligned with itself there is a correlation peak 204. Accordingly GNSS receivers use the ranging code correlation function to synchronize with a received GNSS signal.

Synchronizing with a received signal generally comprises sampling the received GNSS signal to generate a digitized GNSS signal, generating multiple local replicas of the corresponding ranging code, each at a different offset (or lag), and correlating the digitized GNSS signal and the local replicas of the ranging code to detect the ranging code correlation function. The code delay and Doppler frequency (which may also be referred to as the carrier phase) can then be identified from the ranging code correlation function. The code delay represents the shift in time to align the local replica of the ranging code with the received GNSS signal.

Generally, the more accurate the ranging code correlation function, the more accurate the identification of the code delay, and thus the more accurate the decoding of the navigation data embedded in the GNSS signal resulting in a more accurate the position, velocity and time estimate generated by the GNSS receiver. It is generally believed that the higher the sampling rate, the more accurate the detection of the ranging code correlation function and thus the more accurate the identification of the code delay. As described in more detail below, this is because the more samples of the GNSS signal there are the more available offsets (or lags) there are to align the local replica of the ranging code with. Accordingly, many GNSS receivers are configured to use a sampling rate higher than the critical sampling rate to enable accurate identification of the ranging code correlation function and thus the code delay. In particular, many GNSS receivers are configured to use a sampling rate of 16 MHz (or higher) for GPS signals compared to a critical sampling rate of 2 MHz.

However, hardware (e.g. an integrated circuit) configured to determine the ranging code correlation function of a received GNSS signal from samples at a higher sampling rate (i.e. higher than the critical sampling rate) is typically complex, take up substantial amount of silicon area, and consume a significant amount of power. This is because correlating samples at a higher sampling rate requires correlation hardware (e.g. one or more correlators) that can processes a high number of samples per iteration which results in larger (in terms of silicon area) correlation hardware that consumes a significant amount of power. Furthermore, where the samples are stored in memory a higher sampling rate also requires a larger memory to store all of the samples.

Figure 6:
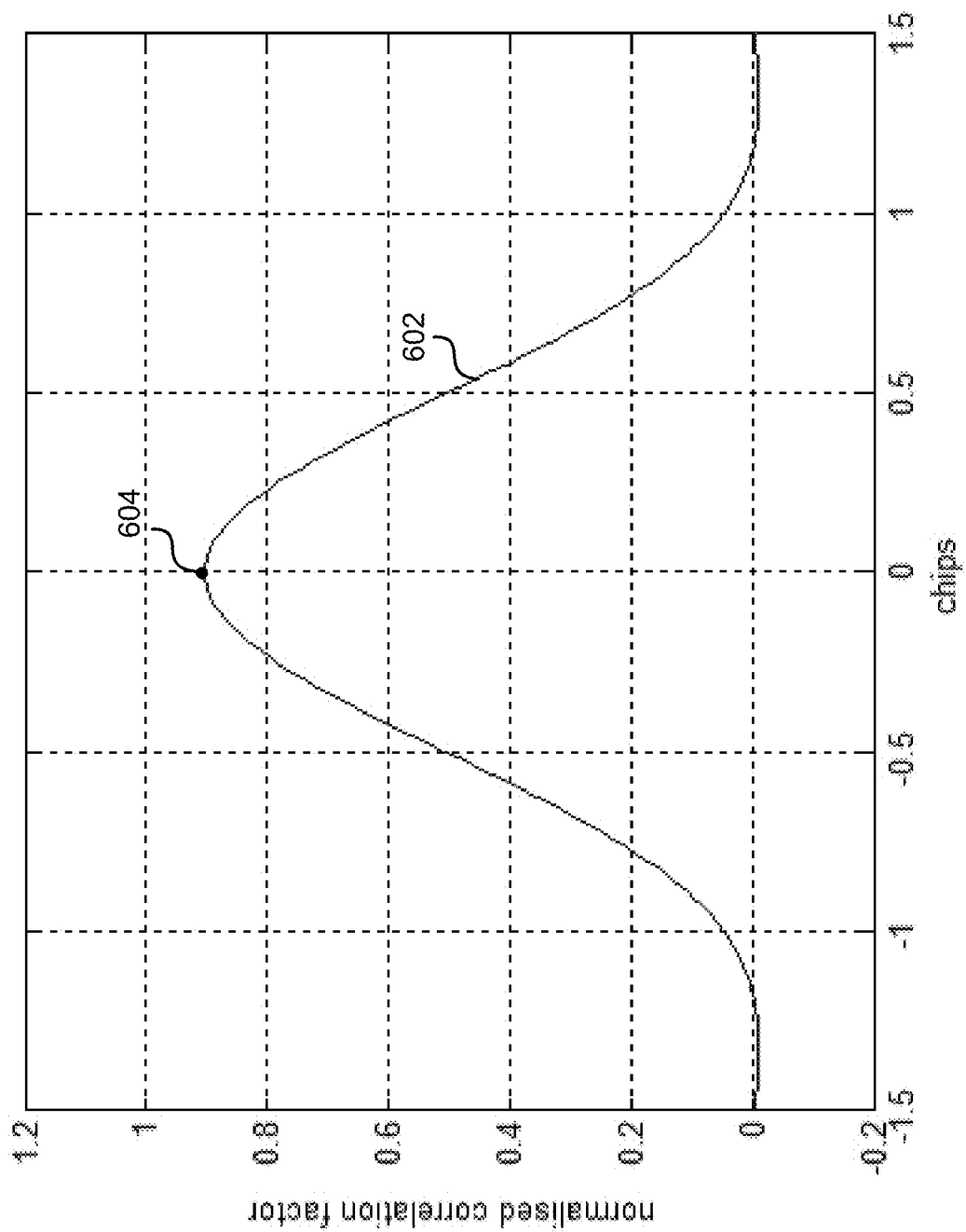
FIG. 6 is a graph of a correlation function of a filtered GPS ranging code with a 2 MHz bandwidth.

Accordingly, described herein are methods, and ranging code correlation function detection systems to efficiently and accurately detect the ranging code correlation function of a received GNSS signal using a lower sampling rate. The ranging code correlation function is the function or curve, such as that shown in FIG. 6, representing the correlation of the received GNSS signal and the corresponding ranging code over a plurality of offsets. The methods include correlating the samples with the corresponding ranging code at a plurality of different offsets from a current estimate of the code delay to generate a plurality of correlation data points (e.g. a first ranging code correlation function), interpolating the correlation data points based on the current estimate of the code delay to generate at least one estimated correlation data point that lies between two of the correlation data points (e.g. a re-timed ranging code correlation function) that more accurately reflects the current estimate of the code delay. The methods, systems and techniques described herein can accurately detect the ranging code correlation function using a lower sampling rate (e.g. using a sampling rate equal to or higher than the critical sampling rate).

As described above, the ranging code correlation function can be used in a GNSS receiver to identify the code delay. However, the ranging code correlation function may be used in a GNSS receiver for other purposes. For example, the ranging code correlation function may also be used in a GNSS receiver to perform multipath mitigation on the received GNSS signal. Specifically, multipath interference occurs when the GNSS receiver receives one or more reflected signals in addition to the direct satellite signal. Multipath mitigation allows the receiver to distinguish directly received signals from reflected signals to mitigate position errors causes by reception of the reflected signal(s). The ranging code correlation function may be used in multipath mitigation to distinguish a correlation peak causes by the actual signal from a correlation peak caused by a reflection.

Figure 3:
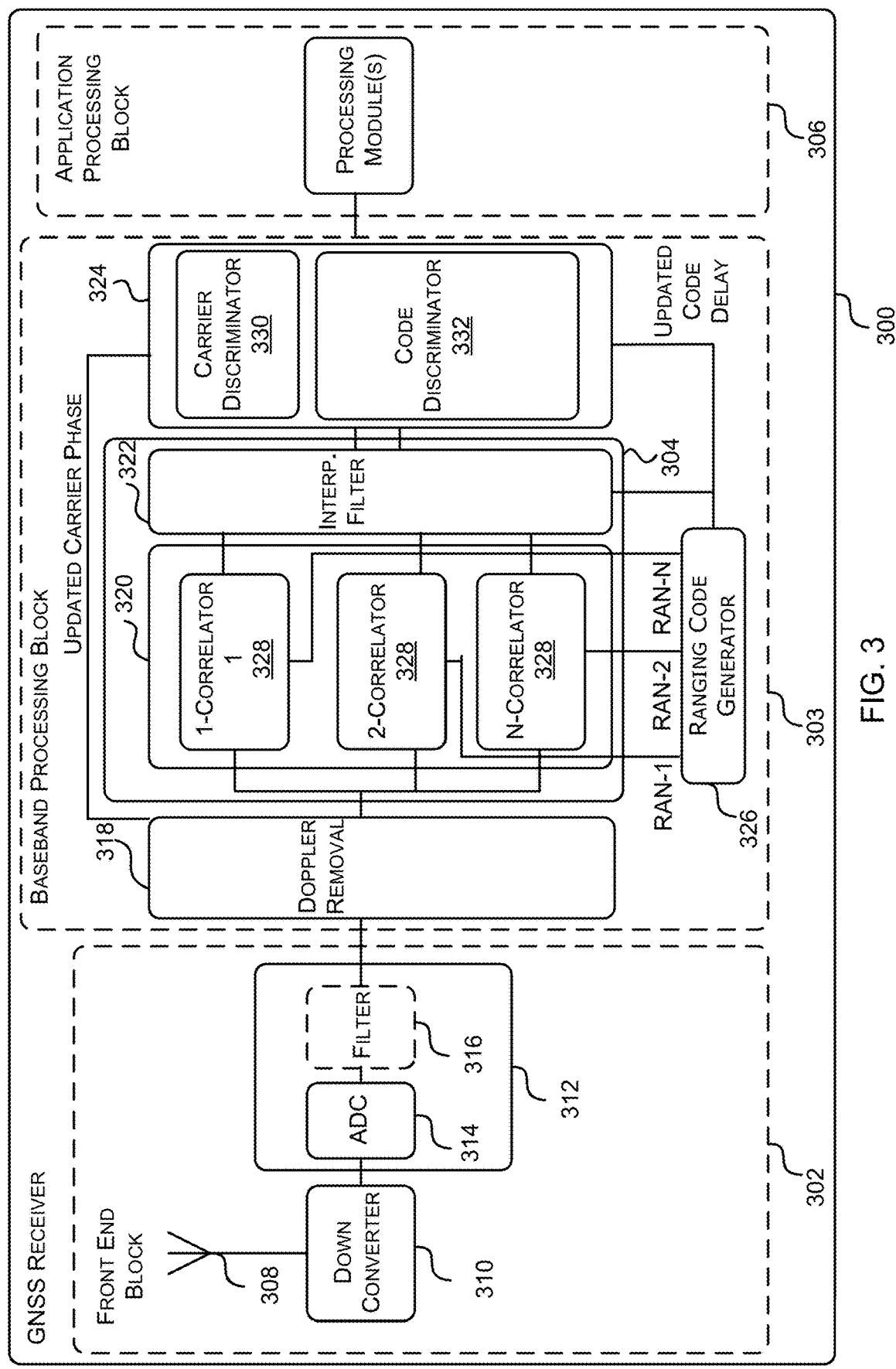
FIG. 3 is a block diagram of an example GNSS receiver comprising an example ranging code correlation function detection system.

Reference is now made to FIG. 3 which illustrates an example GNSS receiver 300 for receiving and processing GNSS signals in which the ranging code correlation function detection systems described herein may be implemented. The GNSS receiver 300 comprises a front end block 302 for receiving GNSS signals and digitizing the received GNSS signals; a baseband block 303 for performing baseband processing on the digitized signal which comprises a ranging code correlation function detection system 304 for detecting the ranging code correlation function of the digitized signals; and a processing block 306 for processing the received signals (e.g. extracting the navigation data contained therein) based on the baseband processing.

The front end block 302 is configured to receive GNSS signals transmitted by GNSS satellites within view and perform analog (e.g. RF) processing thereof, including down-converting the received analog GNSS signals into intermediate frequency (IF) signals, and digitizing the IF signals. Specifically the front end block 302 comprises an antenna 308 configured to receive GNSS signals in a particular frequency band (e.g. the L band). Many GNSS carriers, such as GPS, Galileo and GLONASS, are in the L frequency band which is defined by the Institute of Electrical and Electronics Engineers (IEEE) as the 1 to 2 GHz range of the RF (radio frequency) spectrum. For example the GPS carriers are centered at 1176.45 MHz (L5), 1227.60 MHz, 1381.05 MHZ and 15742 MHZ (L1) frequencies.

The front end block 302 may also comprise a down converter 310 for converting the GNSS signals captured by the antenna 308, which are at the RF carrier frequency, to a complex IF GNSS signal for processing; and a digitization block 312 which receives the IF signals output by the down converter 310 and generates a digital representation thereof at a particular or desired sampling rate.

The digitization block 312 comprises an analog to digital converter (ADC) 314 configured to convert the continuous analog IF signals to a digital representation thereof by generating a series of digital values. This comprises periodically sampling the analog signal at discrete intervals in time. The rate at which the analog signal is sampled is referred to as the sampling frequency, or the sampling rate, of the ADC. In some cases the ADC 314 may be configured to operate at the particular or desired sampling rate. In other cases the ADC 314 may be configured to operate at a sampling rate that is higher than the particular or desired sampling rate. For example, the desired sampling rate may be 2 MHz and the ADC may be configured to operate at a sampling rate of 16 MHz. In these cases the digitization block 312 may also comprise a filter 316 to adjust or alter the sampling rate of the output of the ADC 314 (e.g. via decimation) to the lower desired sampling rate.

The baseband block 303 is configured to perform baseband processing on the digitized GNSS signal to produce GNSS observables useful for processing the digitized GBSS signal. The example baseband block 304 of FIG. 3 comprises a Doppler removal block 318, a ranging code correlation function detection system 304, and a discriminator block 324.

The digitized GNSS signal output by the front end block 302 is provided to the Doppler removal block 318, which may also be referred to as carrier removal block or a carrier demodulator, to remove the carrier from the digitized GNSS signal based on the current estimate of the carrier phase/frequency. In some cases the Doppler removal block 318 may be configured to remove the carrier from the digital signal by multiplying the digitized signal by a local carrier reference signal based on the estimated carrier phase/frequency resulting in a baseband digitized GNSS signal that comprises the ranging code and the navigation data. For GNSS using FDMA (frequency division multiple access) modulation, such as GLONASS, the Doppler removal block 318 accounts, not only for the Doppler shift caused by the motion between the satellite and the GNSS receiver, but also the frequency of the received satellite signal.

The baseband digitized GNSS signal output from the Doppler removal block 318 is provided to the ranging code correlation function detection system 304 which generates and outputs a set of correlation data points that represents the ranging code correlation function of the baseband digitized GNSS signal. As described above the ranging code correlation function is the function or curve, such as that shown in FIG. 6, representing the correlation of the received GNSS signal and the corresponding ranging code over a range of offsets. The ranging code correlation function detection system 304 of the embodiments described herein comprises a correlation block 320 and an interpolation filter 322.

The correlation block 320 is configured to correlate the baseband digitized GNSS signal with a plurality of ranging code replicas (RAN-1 . . . RAN-N) generated by a ranging code generator 326 that are offset or delayed from the current estimate of the code delay by different amounts. As described above with reference to FIG. 2, when the baseband digitized GNSS signal is perfectly aligned with the local replica of the ranging code the correlation will be at a maximum.

The correlation block 320 comprises one or more correlators 328 for generating one or more correlation data points that represent the ranging code correlation function of the received digitized GNSS signal. The term "correlator" is used herein to mean a hardware component, a software component, or a set of hardware and/or software components, that is configured to receive two input signals and generate a correlation data point that represents the statistical correlation between the two input signals. A correlator may include any suitable components such as, but not limited to an integrator and an averager.

The one or more correlators 328 in the correlation block 320 are configured to correlate the baseband digitized GNSS signal with multiple (e.g. N) replicas of the corresponding ranging code, each with a different offset or delay from the estimated code delay, to generate a plurality of correlation data points that correspond to the different offsets. For example, the correlation block 320 may perform three correlations—a prompt correlation, a late correlation, and an early correlation. The prompt correlation correlates the baseband digitized GNSS signal with a local replica of the corresponding ranging code that is aligned with the baseband digitized GNSS signal according to the current code delay estimate, which may referred to herein as the prompt ranging code. The late correlation correlates the baseband GNSS signal with a local replica of the corresponding ranging code that is shifted later in time relative to the prompt ranging code, which may be referred to herein as the late ranging code. The early correlation correlates the baseband digitized GNSS signal with a local replica of the corresponding ranging code that is shifted earlier in time relative to the prompt ranging code, which may be referred to herein as the early ranging code.

The spacing between the early and late ranging codes, also referred to as the E-L spacing, or the spacing between the early and late ranging codes, is an important characteristic of the GNSS receiver 300. It is generally understood that the E-L spacing should be less than 2 chips, but if it is too small it will be difficult to distinguish the early and late correlations. Typically the smaller the E-L spacing the more robust the code delay estimate.

Figure 4:
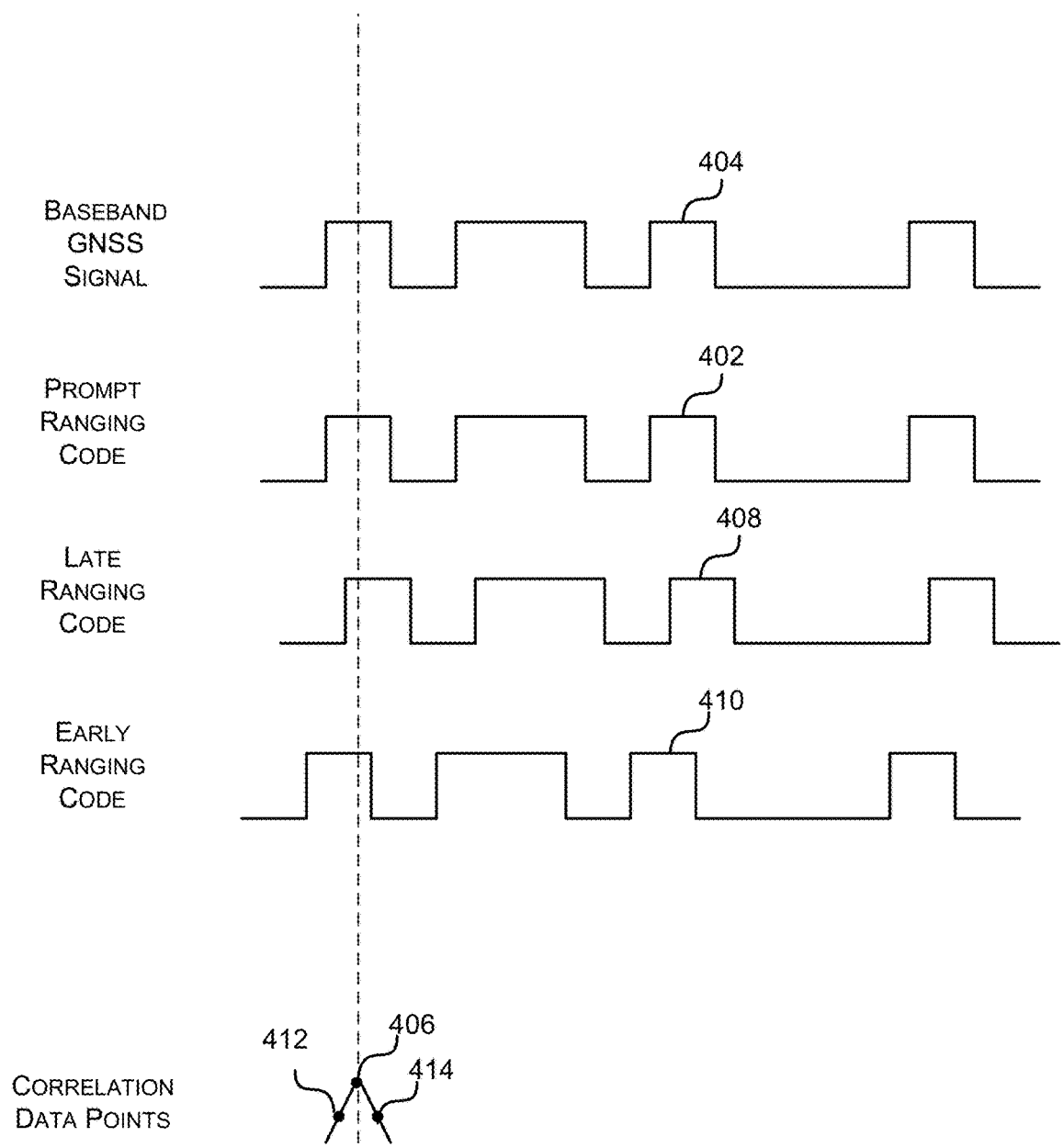
FIG. 4 is a schematic diagram illustrating prompt, late and early ranging codes in relation to a received GNSS signal.

With reference to FIG. 4, when the code delay has been correctly estimated the prompt ranging code 402 is perfectly aligned with the baseband digitized GNSS signal 404 and the correlation data point 406 corresponding to the prompt correlation will represent the correlation peak; and the late ranging code 408 and the early ranging code 410 are shifted earlier and later in time, respectively, relative to the prompt ranging code by an equal amount and the magnitude of the correlation data points 412 and 414 corresponding to the early and late correlations are comparable. Where, however, the prompt ranging code is not perfectly aligned with the baseband digitized GNSS signal the correlation data points can provide an indication of how to correct the current estimate of the code delay to correctly align the prompt ranging code with the baseband digitized GNSS signal.

It will be evident to a person of skill in the art that this is an example correlation block 320 only and that other correlation blocks may be configured to perform fewer, more and/or different correlations.

Referring back to FIG. 3 the discriminator block 324 is configured to receive the plurality of correlation data points representing the ranging code correlation function of the received signal and update the estimates of the carrier phase and the code delay based on the received correlation data points. In the example of FIG. 3 the discriminator block 324 comprises a carrier discriminator 330 for tracking and updating the carrier phase based on the received correlation data points 320, and a code discriminator 332 for tracking and updating the code delay based on the received correlation data points. The discriminators 330 and 332 may be configured to track and update the estimates using any suitable combination of the received correlation data points generated in accordance with any suitable criteria. For example, in some cases the carrier discriminator 330 may be configured to track and update the estimate of the carrier phase based on the correlation data point corresponding to a prompt correlation; and the code discriminator 332 may be configured to track and update the code delay based on the correlation data points corresponding to early and late correlations.

In one example, the code discriminator 332 may be configured to update the code delay based on the difference between the correlation data points corresponding to early and late correlations. In this way the difference between the early and late correlation data points act as an error signal indicating which way to shift the prompt ranging code to align the prompt ranging code with the baseband GNSS signal. A code discriminator that is configured in this manner may be referred to as an early minus late (EML) discriminator. It will be evident to a person of skill in the art that this is an example only and that the code delay may be determined using any code discriminator with suitable characteristics.

The processing block 306 is configured to process the received signal in accordance with the ranging code correlation function detected by the ranging code correlation function detection system 304. For example the processing block 306 may be configured to calculate the position and time of the GNSS receiver based on the navigation data in the received signal and the timing information obtained from the ranging code correlation function.

It is well known that so long as the sampling rate of a digitized signal is equal to or above the Nyquist rate (also referred to as the critical sampling rate), defined as twice the highest frequency of interest, then all the frequencies of interest in the original analog signal can be reconstructed.

Figure 5:
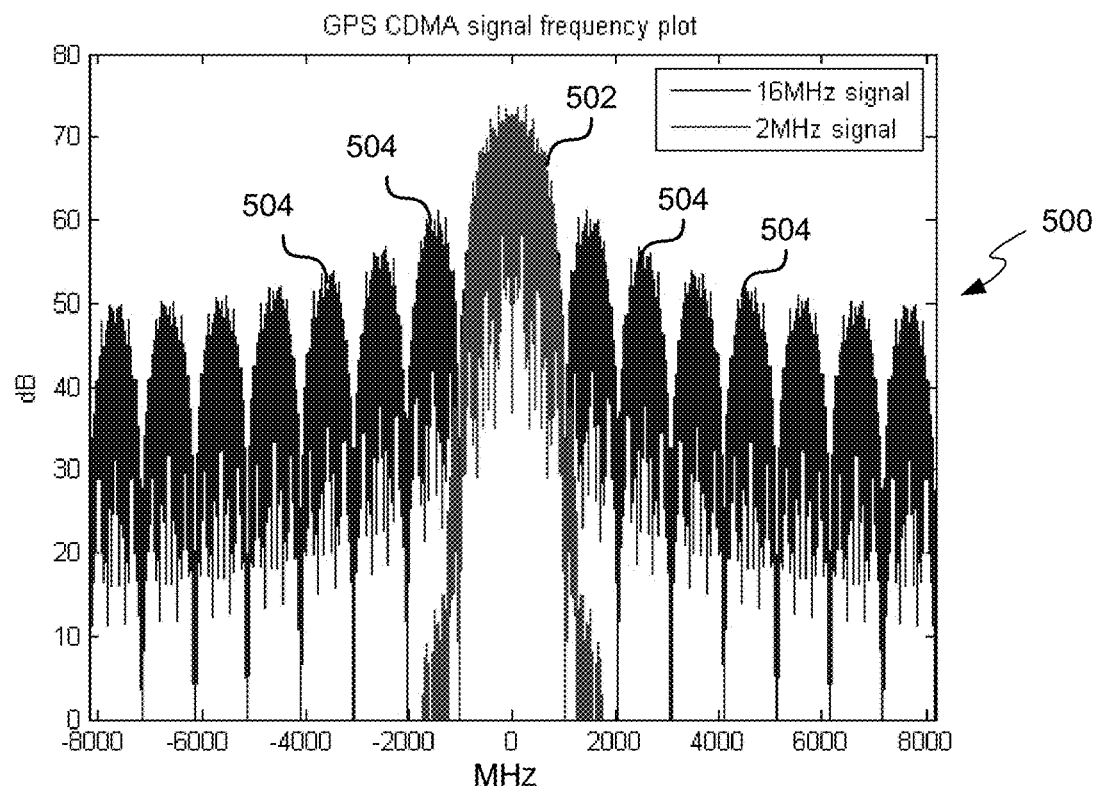
FIG. 5 shows graphs of the frequency spectrum of a GPS signal and the frequency spectrum of a Galileo signal.
Figure 5:
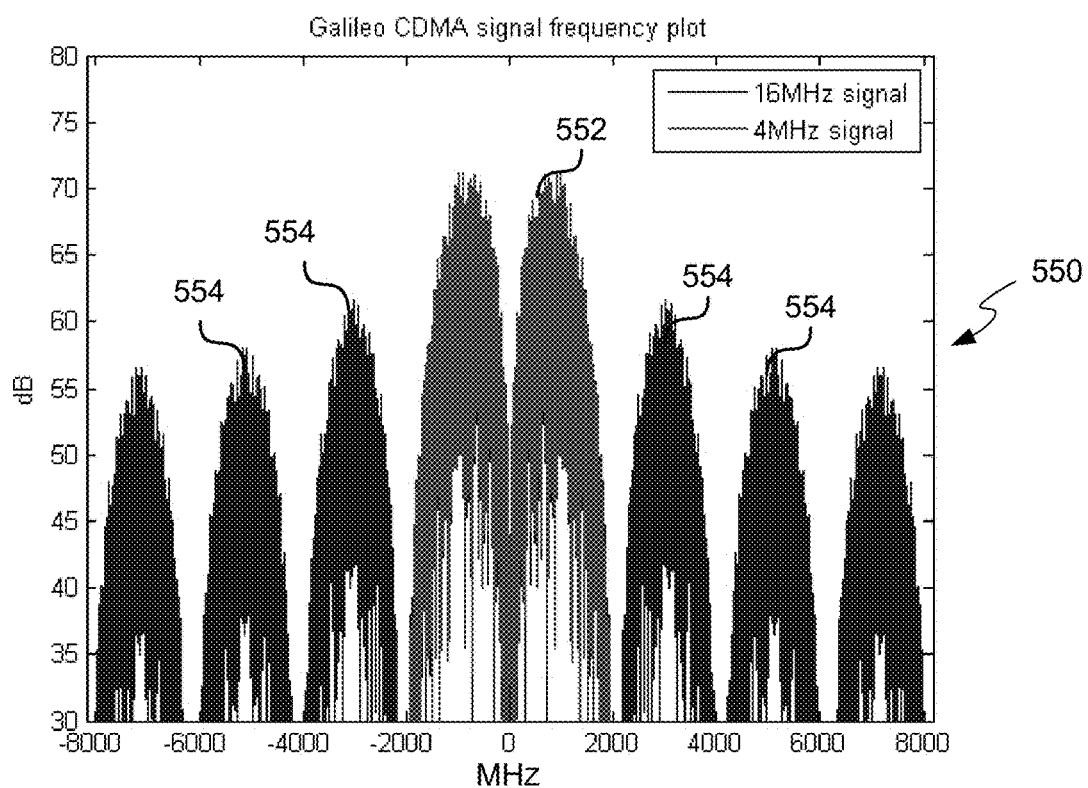

A CDMA GNSS signal has a frequency spectrum that has a main lobe centered at zero and a number of increasingly smaller side lobes extending outwardly therefrom. For example. FIG. 5 shows the frequency spectrum 500 of a 16 MHz GPS signal that has a main lobe 502 and a plurality of side lobes 504; and the frequency spectrum 550 of a 16 MHz Galileo signal that has a main lobe 552 and a plurality of side lobes 554. Testing has shown that the navigation data and the code delay of a received GNSS signal can be accurately obtained from the frequencies in the main lobe 502 or 552 of the received signal (e.g. by filtering out the high frequencies) despite the correlation peak being less sharp and lower when the received signal is filtered to exclude the frequencies outside of the main lobe 502 or 552.

Specifically, FIG. 2 illustrates the ranging code correlation function 202 of a 64 MHz GPS ranging code that has been correlated with a 64 MHz GPS ranging code. It can be seen from FIG. 2 that the correlation peak 204 is very sharp. In contrast, FIG. 6 illustrates the ranging code correlation function 602 of a 64 MHz GPS ranging code filtered to 2 MHz and a 64 MHz GPS ranging code. It can be seen that the correlation peak 604 in FIG. 6 is less sharp than the peak 204 in FIG. 2 reflecting the loss of high frequencies in the correlation. It also can be seen that the correlation peak 604 is lower in FIG. 6 than in FIG. 2 (i.e. the correlation peak is 1.0 in FIG. 2 compared to 0.905 in FIG. 5).

Figure 7:
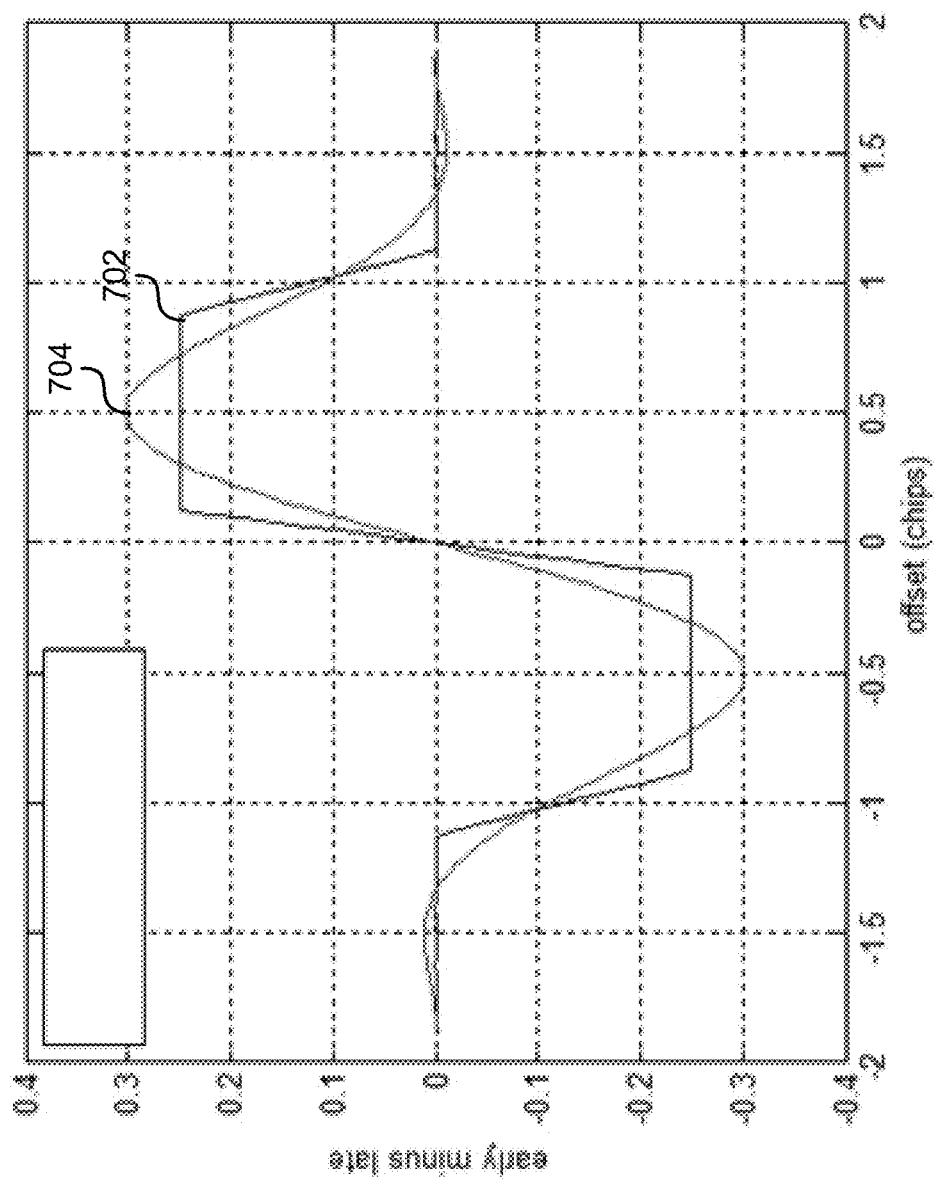
FIG. 7 is a graph of an early minus late (EML) discriminator with 0.25 early-late (E-L) chip spacing for a GPS ranging code with 64 MHz bandwidth and a GPS ranging code with 2 MHz bandwidth.
Figure 8:
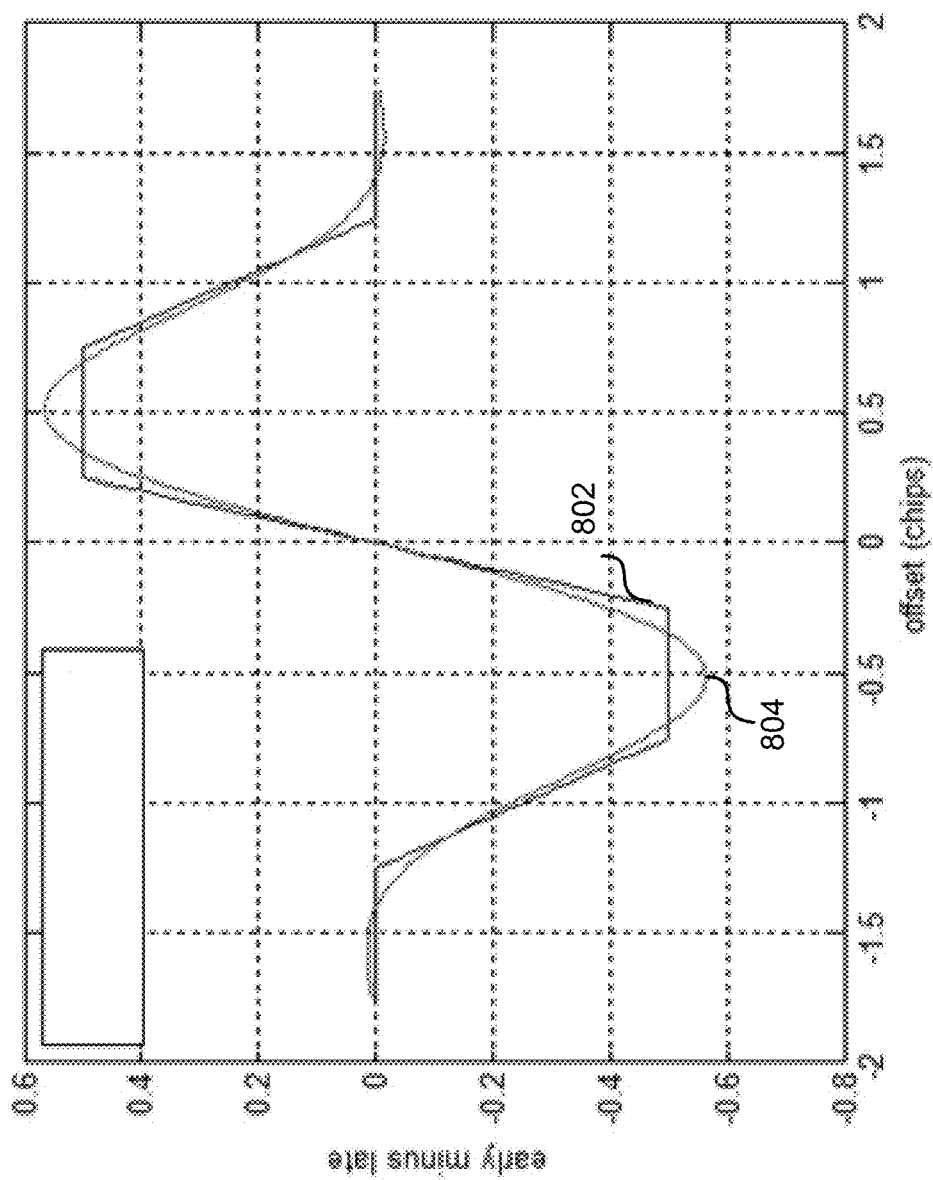
FIG. 8 is a graph of an early minus late (EML) discriminator with 0.5 early-late (E-L) chip spacing for a GPS ranging code with 64 MHz bandwidth and a GPS ranging code with 2 MHz bandwidth.
Figure 9:
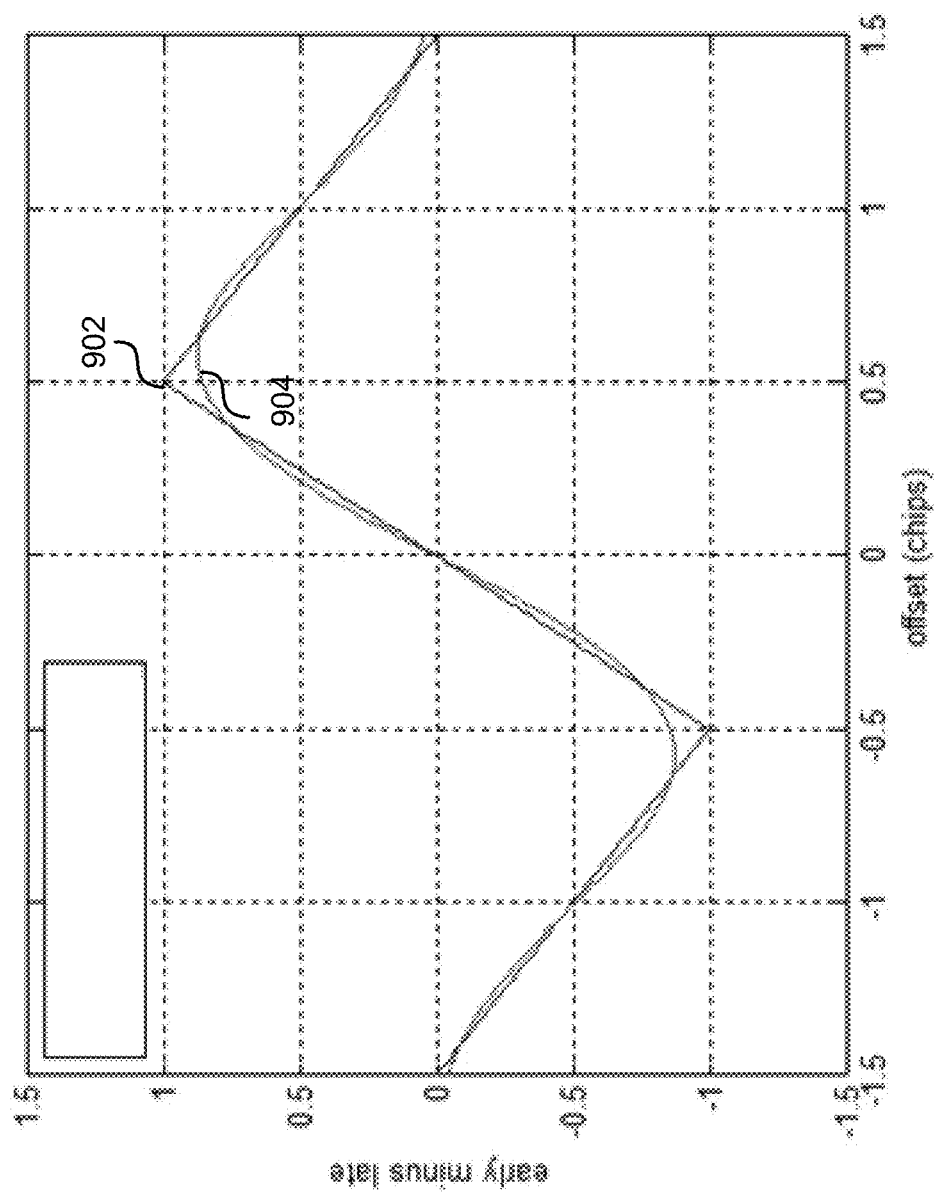
FIG. 9 is a graph of an early minus late (EML) discriminator with 1.0 early-late (E-L) chip spacing for a GPS ranging code with 64 MHz bandwidth and a GPS ranging code with 2 MHz bandwidth.

Despite the correlation peak being less sharp, and lower, when the received signal is filtered to exclude the frequencies outside of the main lobe, testing has shown that the code delay can be determined with the same level of accuracy by correlating the unfiltered GPS ranging code (the 64 MHz GPS ranging code) or the filtered GPS ranging code (the 2 MHz GPS ranging code) with the 64 MHz GPS ranging code. In particular, FIGS. 7-9 show the output of an early-minus late (EML) discriminator where (i) the baseband digitized GNSS signal is a 64 MHz GPS ranging code, and (ii) where the baseband digitized GNSS signal is a filtered 2 MHz GPS ranging code. FIG. 7 is a graph of the output of an early minus late (EML) discriminator with 0.25 early-late (E-L) chip spacing for a GPS ranging code with 64 MHz bandwidth 702 and a GPS ranging code with 2 MHz bandwidth 704; FIG. 8 is a graph of the output of an EML discriminator with 0.5 E-L chip spacing for a GPS ranging code with 64 MHz bandwidth 802 and a GPS ranging code with 2 MHz bandwidth 804; and FIG. 9 is a graph of the output of an EML discriminator with 1.0 early-E-L chip spacing for a GPS ranging code with 64 MHz bandwidth 902 and a GPS ranging code with 2 MHz bandwidth 904.

The uncertainty of an EML discriminator is determined by the slope of the early minus late transfer function and the noise at the EML discriminator output. The position uncertainties for the three scenarios shown in FIGS. 7-9 are summarized in Table 1 assuming that the carrier to noise density (CNO) is 43 dB at the correlator input and that the correlator output is averaged coherently for 10 ms.

TABLE 1

| E-L Spacing | Bandwidth | Slope at zero crossing | Noise at discriminator output | Position Uncertainty |
|---|---|---|---|---|
| 0.25 chip | 64 MHz | 2.0 | 0.1 rms | 0.05 chips rms |
| 0.5 chip | 64 MHZ | 2.0 | 0.1 rms | 0.05 chips rms |
| 1.0 chip | 64 MHz | 2.0 | 0.1 rms | 0.05 chips rms |
| 0.25 chip | 2 MHz | 0.97 | 0.095 rms | 0.098 chips rms |
| 0.5 chip | 2 MHz | 1.78 | 0.095 rms | 0.053 chips rms |
| 1.0 chip | 2 MHz | 2.47 | 0.095 rms | 0.039 chips rms |

It can be seen from Table 1 that the position uncertainly is the same for all E-L spacings for a 64 MHz bandwidth baseband digitized GNSS signal, but it varies with E-L spacing for a 2 MHz bandwidth baseband digitized GNSS signal. The lowest position uncertainly is obtained with 1 chip spacing and a 2 MHz bandwidth baseband digitized GNSS signal which gives 2.28 dB lower uncertainty than with any E-L spacing and a 64 MHz bandwidth baseband digitized GNSS signal. Accordingly filtering the received GNSS signal to a bandwidth of 2 MHz does not compromise the accuracy which the code delay can be determined.

As a result, the critical sampling rate to obtain the frequencies of interest for CDMA GNSS signals is twice the highest frequency of the main lobe. As shown in FIG. 5 the bandwidth of the main lobe of a GPS signal is substantially 2 MHz (e.g. 2.046 MHz), thus the highest frequency in the main lobe is 1 MHz and the critical complex sampling rate is substantially 2 MHz (e.g. 2.046 MHz). Similarly the bandwidth of the main lobe of a Galileo signal is substantially 4 MHz (e.g. 4.092 MHz), thus the highest frequency in the main lobe is 2 MHz and the critical complex sampling rate is substantially 4 MHz (e.g. 4.092 MHz). The critical sampling rates for a number of GNSSs are summarized below in Table 2.

TABLE 2

| GNSS | Main Lobe Bandwidth | Complex Sampling Rate | Samples Per Chip |
|---|---|---|---|
| GPS | 2.046 MHz | 2.046 MHz | 2 |
| GLONASS* | 1.022 MHz | 9.0 MHz | 17.6125 |
| BeiDou | 4.092 MHz | 4.092 MHz | 2 |
| Galileo | 4.092 MHz | 4.092 MHz | 4 |

It is noted that in contrast to most GNSSs (such as GPS, Galileo and BeiDou), instead of using CDMA, GLONASS uses frequency division multiple access (FDMA) for the transmission of its signals. This means that instead of each satellite being allocated a unique ranging code to distinctly identify the satellite, all of the satellites use the same ranging code but each satellite transmits on a different frequency. Accordingly a GLONASS signal comprises more frequencies of interest thus the critical sampling rate for a GLONASS signal is 9 MHz.

However, as described above, many GNSS receivers that are known to the Applicant are configured so that the sampling rate of the ADC is greater than the identified critical sampling rate to be able to more accurately detect the ranging code correlation function of the sampled/digitized GNSS signal. For example, many GNSS receivers that are known to the Applicant are configured to process samples at a sampling rate of 16 MHz or higher. This is because a lower number of samples limits the offsets for the local replicas of the ranging code since the local replica of the ranging code can only be aligned with an input sample. This makes it more difficult to accurately identify the code delay from the correlation data points generated by the correlation block 320.

Figure 10:
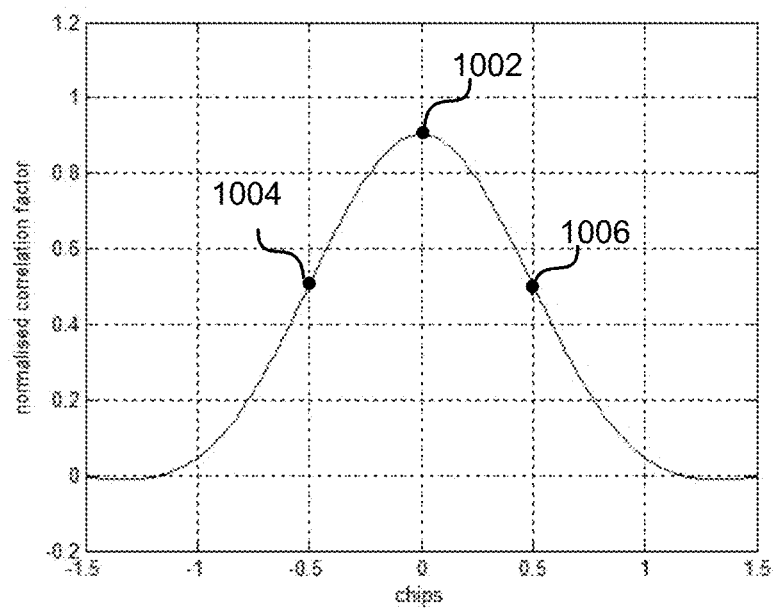
FIG. 10 is a schematic diagram illustrating correlation data points corresponding to prompt, early and late correlations.
Figure 10:
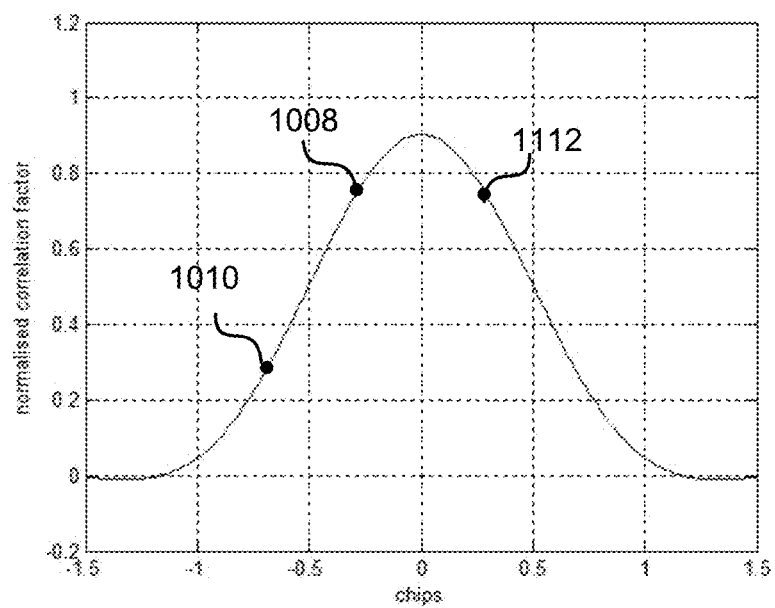

Referring now to FIG. 10, if the samples are spaced such that the prompt ranging code can be placed at (or near) the correlation peak 1002 and the early and late ranging codes can placed on either side of the correlation peak 1004 and 1006 on the correlation curve then an accurate determination of the code delay can be made. If, however, the samples are spaced such that the prompt, early and late ranging codes are placed at points 1008, 1110 and 1112 respectively on the correlation curve it is difficult to accurately determine the code delay.

However, as described above, hardware (e.g. an integrated circuit) to determine the ranging code correlation function for a received GNSS signal using a higher sampling rate than the critical sampling rate is typically complex, takes up a significant amount of silicon area, and consumes a significant amount of power.

To address these problems the ranging code correlation function detection system 304 is configured with an interpolation filter 322 to generate, from the correlation data points output by the correlation block 320, one or more estimated correlation data points that correspond to an offset or delay that lies between an offset used in the correlation block (i.e. an offset that is between two samples of the digitized GNSS signal). In other words the interpolation filter 322 generates new correlation data points between the correlation data points generated by the correlation block 320 to produce a more accurate representation of the ranging code correlation function. This allows an accurate ranging code correlation function to be determined from a lower sampling rate (e.g. a sampling rate at are above the critical sampling rate for the GNSS (e.g. 2 MHz for GPS)).

In particular, the updated code delay generated by the discriminator block 324 comprises a whole portion and a partial or fractional portion. The whole portion specifies the location of the estimated code delay in terms of a whole number of samples of the digitized GNSS signal and the partial or fractional portion specifies the estimated code delay in terms of a fraction of a sample of the digitized GNSS signal. The whole portion of the estimated code delay is provided to the ranging code generator 326 to generate N local replicas of the ranging code (RAN-1 . . . RAN-N) with different whole sample offsets relative to the whole portion of the estimated code delay to generate a plurality of correlation data points corresponding to the offsets. The partial portion of the estimated code delay is provided to the interpolation filter 322 (which also may be referred to as a fractional delay filter) which generates one or more estimated correlation data points from the correlation data points generated by the correlation block 320 that correspond to offsets that are shifted by the fraction of a sample from the original offsets. In other words the ranging code generator 326 adjusts the local replicas of the ranging code generator to reflect whole sample changes to the estimated code delay and the interpolation filter 322 adjusts or re-times the correlation data points to reflect the fraction of a sample changes to the estimated code delay.

Figure 11:
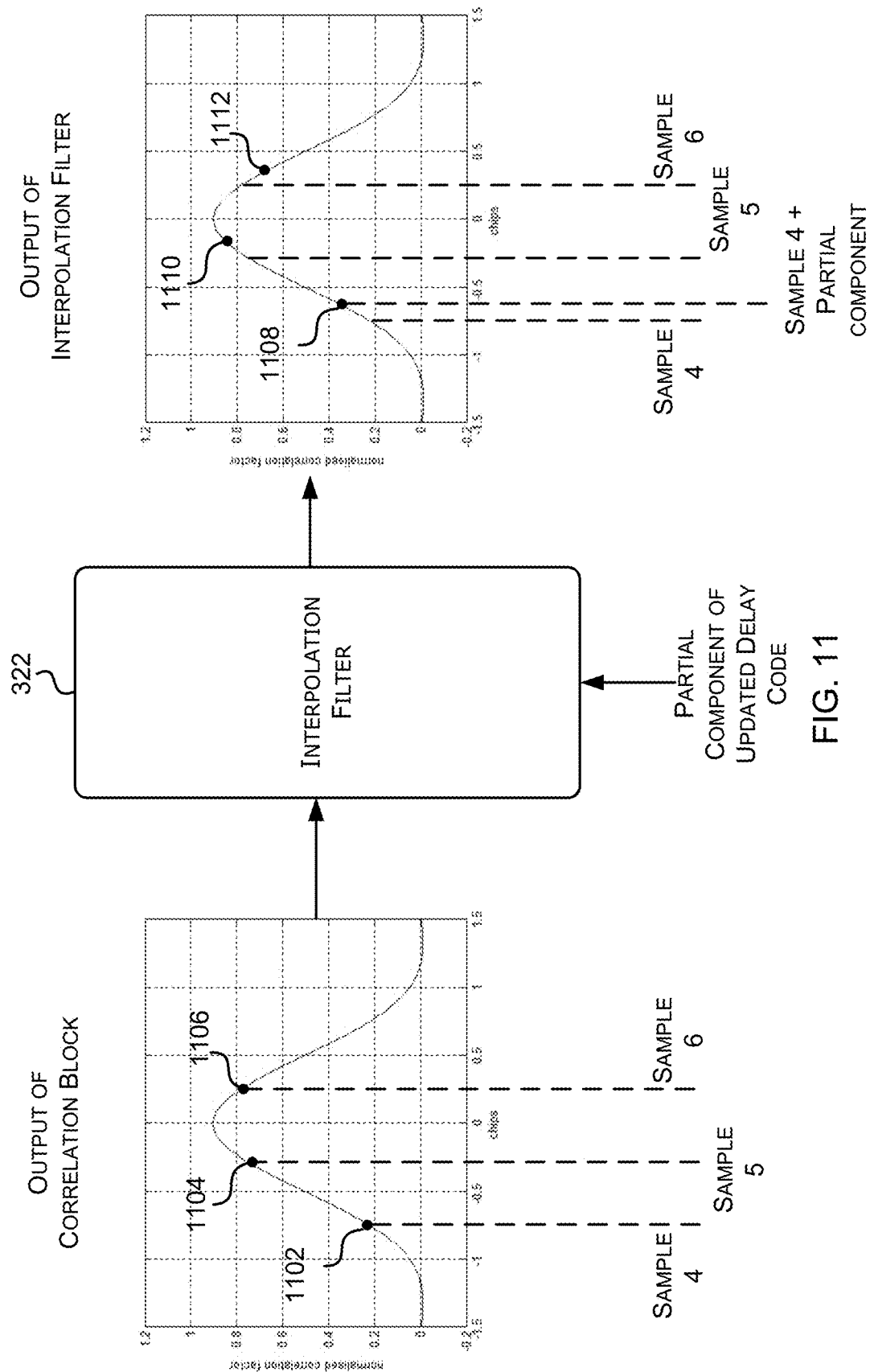
FIG. 11 is a schematic diagram illustrating a first example input and output of the interpolation filter.

This concept will be further explained by example with reference to FIG. 11. In particular, if the estimated code delay is 5.1 (i.e. a whole portion of 5 samples and a partial or fractional portion of 0.1 samples) then the ranging code generator 326 receives the whole portion of the estimated code delay (e.g. 5) and generates N local replicas of the ranging code that are aligned with the N samples closest to the estimated code delay. For example where N is 3 and the estimate code delay is 5 samples then the ranging code generator 326 may be configured to generate a local replica of the ranging code aligned with sample 4, a local replica of the ranging code aligned with sample 5, and a local replica of the ranging code aligned with sample 6. This results in three correlation data points 1102, 1104 and 1106 that represent the correlation at these three offsets (sample 4, sample 5, and sample 6).

The interpolation filter 322 receives the three correlation data points 1102, 1104 and 1106 and performs an interpolation between the correlation data points 1102, 1104, and 1106 to generate one more estimated correlation data points 1108, 1110 and 1112 that correspond to offsets that are shifted by the fraction of the sample (specified in the partial portion of the estimated code delay) relative to the offsets used by the correlation block 320. For example, where the partial portion is 0.1 of a sample then the interpolation filter 322 may interpolate the correlation data points 1102, 1104 and 1106 to generate estimated correlation data points 1108, 1110 and 1112 that correspond to the original offsets (sample 4, sample 5, and sample 6) shifted by 0.1 of a sample.

In some examples, the interpolation filter 322 may be implemented as a polyphase finite impulse response (FIR) interpolation filter. An FIR interpolation filter receives an input a digitized signal and calculates values at a particular fractional sample offset (e.g. at 1/32 a sample) by computing the convolution of the input samples and the impulse response of the filter. The impulse response of the filter is defined by a set of coefficients selected to produce an output with certain frequency domain or time domain characteristics. In other words the output of an FIR interpolation filter is the sum of each coefficient multiplied by each corresponding input sample. There is one coefficient per tap of the filter.

A polyphase FIR interpolation filter stores a plurality of sets of coefficients (each set comprises one coefficient per tap) each corresponding to a particular fractional sample offset or delay to allow the FIR filter to be used for a plurality of different offsets or delays. For example, if the polyphase FIR interpolation filter is configured to calculate values at 1/32 sample increments the polyphase FIR interpolation filter may be configured to store 32 sets of coefficients which can be used to interpolate at a 0/32, 1/32, 2/32 . . . sample offset or delay. The set of coefficients to be used by the FIR filter are selected based on the partial or fractional component of the updated delay code. For example, to interpolate at 1/32 sample offset then the coefficients corresponding to a 1/32 offset or delay are selected.

Figure 12:
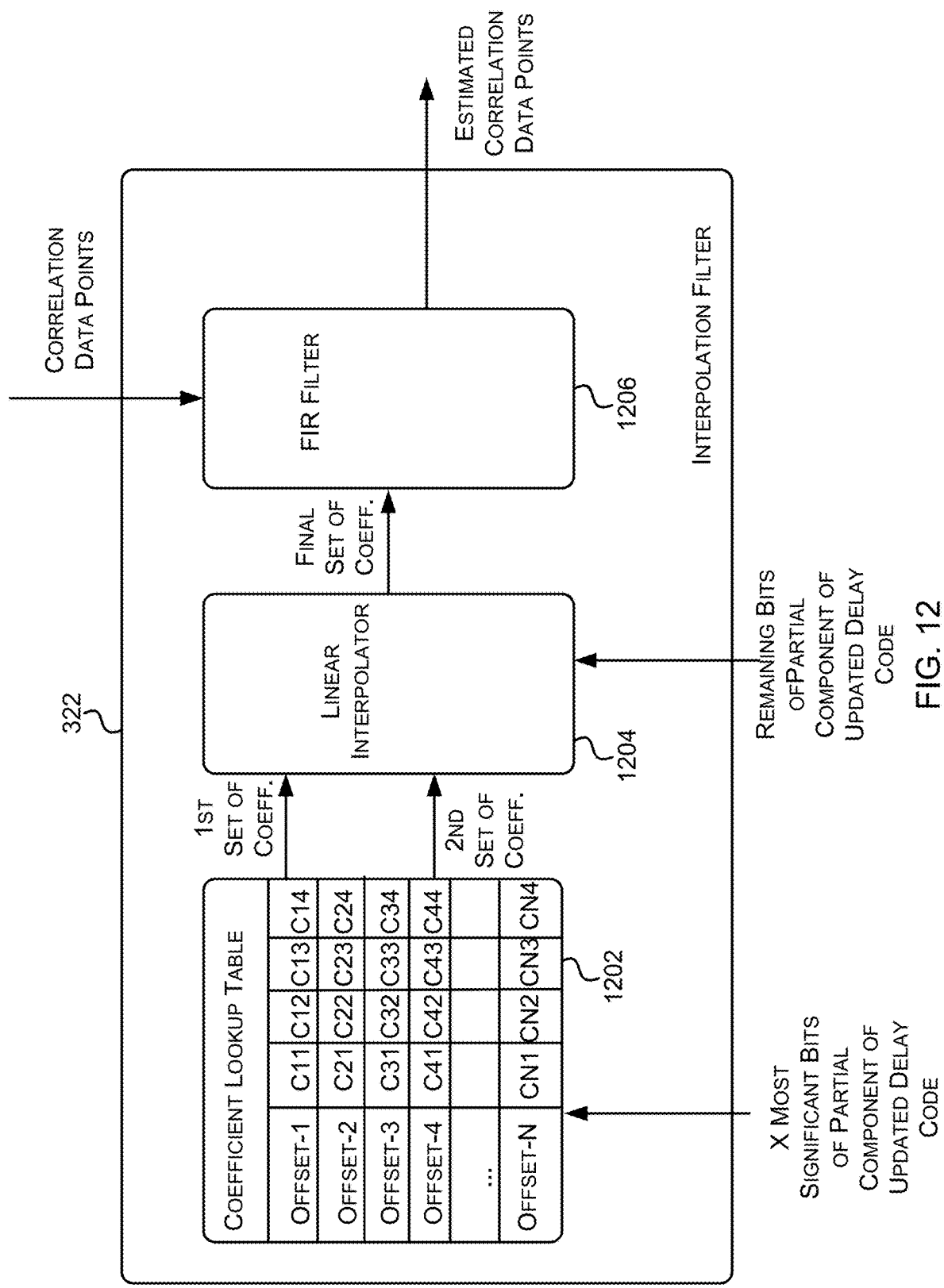
FIG. 12 is a block diagram of a first example interpolation filter.

Reference is made to FIG. 12 which illustrates an example interpolation filter 322 implemented as a polyphase FIR interpolation filter. In this example the interpolation filter 322 comprises a coefficient lookup table 1202, a linear interpolator 1204 and an FIR filter 1206. The coefficient lookup table 1202 comprises N rows and Z columns wherein N in the number of coefficient sets and Z is the number of filter taps. Accordingly each row stores a set of coefficients (one per tap) corresponding to a particular partial or fractional sample offset or delay. In the example shown in FIG. 12 there are four coefficients per row indicating a 4-tap filter, but it will be evident to a person of skill in the art that this is an example only and there may be more or fewer coefficients per row.

The X most significant bits of the partial portion timing, wherein X is an integer, are used to select the two sets of coefficients in the coefficient lookup table corresponding to the offsets that are closest to the desired sample timing. For example if there are ten sets of coefficients stored in the coefficient lookup table each representing offsets at 1/10 sample intervals and the partial component delay is 0.15 then the coefficients corresponding to a 1/10 offset and the coefficients corresponding to a 2/10 offset may be selected as the first and second set of coefficients.

The linear interpolator 1204 performs a linear interpolation between the first and second set of coefficients received from the coefficient lookup table 1202 based on the remaining bits of the partial component of the updated delay code to generate a final set of coefficients. The final set of coefficients are then used as the coefficients of the impulse response and are used by the FIR filter 1206 to generate the one or more estimated correlation data points from the correlation data points output by the correlation block.

In other examples the interpolation filter 322 may be implemented as a farrow FIR interpolation filter. In a farrow FIR interpolation filter, instead of storing discrete sets of coefficients, each coefficient is represented by a $K^{th}$ order polynomial wherein the desired fractional or partial offset is the polynomial variable.

Figure 13:
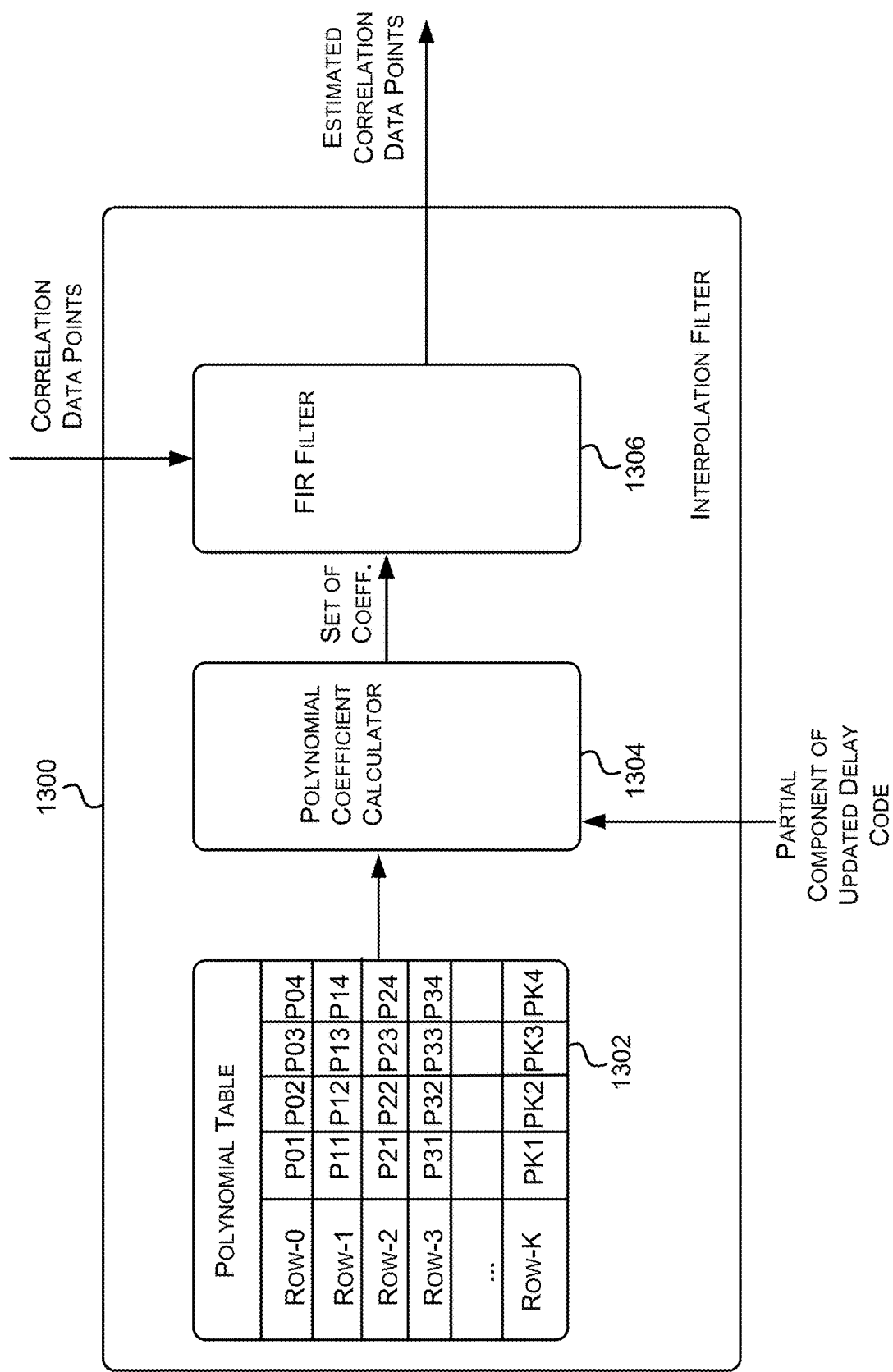
FIG. 13 is a block diagram of a second example interpolation filter.

Reference is made to FIG. 13 which illustrates an example interpolation filter 1300, which may be used as the interpolation filter 322 of FIG. 3, implemented as a farrow FIR interpolation filter. In this example the interpolation filter 1300 comprises a polynomial table 1302, a polynomial coefficient calculator 1304 and an FIR filter 1306. Whereas the coefficient lookup table 1202 of FIG. 12 comprised N rows wherein each row comprised the coefficients for a particular offset or delay, the polynomial table 1302 comprises K rows and Z columns where each column represents a coefficient of the impulse response as a polynomial and each column represents the polynomial coefficients for a $K^{th}$ order polynomial where K is an integer and Z is the number of taps of the filter. For a $K^{th}$ order polynomial there will be K+1 number of rows in the polynomial table 1302. For example, the first column in the polynomial table 1302 of FIG. 13 represents a $K^{th}$ order polynomial $P01+P11*x+P21*x^2+ \ldots +PK1*x^k$ where x is the input variable.

The polynomial coefficient calculator evaluates the polynomial with the partial component of the updated delay code as the polynomial variable to generate a set of coefficients. For example, in the example shown in FIG. 13 the polynomial coefficient calculator 1304 calculates the first impulse response coefficient by calculating $P01+P11*x+P21*x^2+ \ldots +PK1*x^k$ where x is the partial component of the updated delay code. The set of coefficients generated by the polynomial coefficient calculator 1304 are used as the coefficients of the impulse response and are used by the FIR filter 1306 to generate the one or more estimated correlation data points from the correlation data points output by the correlation block.

Implementing the interpolation filter 322 as a farrow FIR interpolation filter may provide certain benefits over implementing the interpolation filter 322 as a polyphase FIR interpolation filter. Specifically, the polynomial table 1302 is generally smaller (e.g. has less rows) than the coefficient lookup table 1202 of a polyphase FIR interpolation filter thus takes up less space and has proven to produce more accurate coefficients (i.e. coefficients that more accurately correspond to the desired partial or fractional delay or offset). For example, in some cases it may take 32 sets of coefficients (i.e. a coefficient lookup table with 32 rows) to produce an accurate set of coefficients for the impulse response whereas a similar level of accuracy can be achieved with a $4^{th}$ order polynomial which requires only 5 rows in a polynomial table 1302.

In either example the interpolation filter 322 is tuned to the desired shape of the ranging code correlation function for the particular GNSS (e.g. the shape shown in FIG. 6). In particular the coefficients may be determined by generating a synthetic GNSS signal, filtering the signal to the critical bandwidth (e.g. the main lobe bandwidth), sampling the filtered signal at different critical sampling rate offsets (e.g. different 2 MHz offset for GPS), correlating the sampled and filtered signals to generate a set of correlation data points for each sampled and filtered signal, and determining coefficients of a FIR filter that will map these sets of correlation data points to the correlation data points that fall on a correlation curve having the desired shape (e.g. the shape shown in FIG. 6).

The number of correlation data points generated by the correlation block 320 (and thus input to the interpolation filter 322), the number of taps of the interpolation filter 322 and the number of estimated data points generated by the interpolation filter 322 will be application and/or GNSS specific. For example, if the ranging code correlation function output by the interpolation filter 322 (i.e. the estimated correlation data points) are to be used by a code discriminator 332 to generate an updated code delay for a GPS signal the correlation block 320 may be configured to generated four correlation data points that represent two early and two late correlation data points, the interpolation filter 322 may be configured to generate four re-timed estimated correlation data points using four taps. However, it will be evident to a person of skill in the art that this is an example and a different number of correlation data point, taps, and estimated correlation data points may be used.

Figure 14:
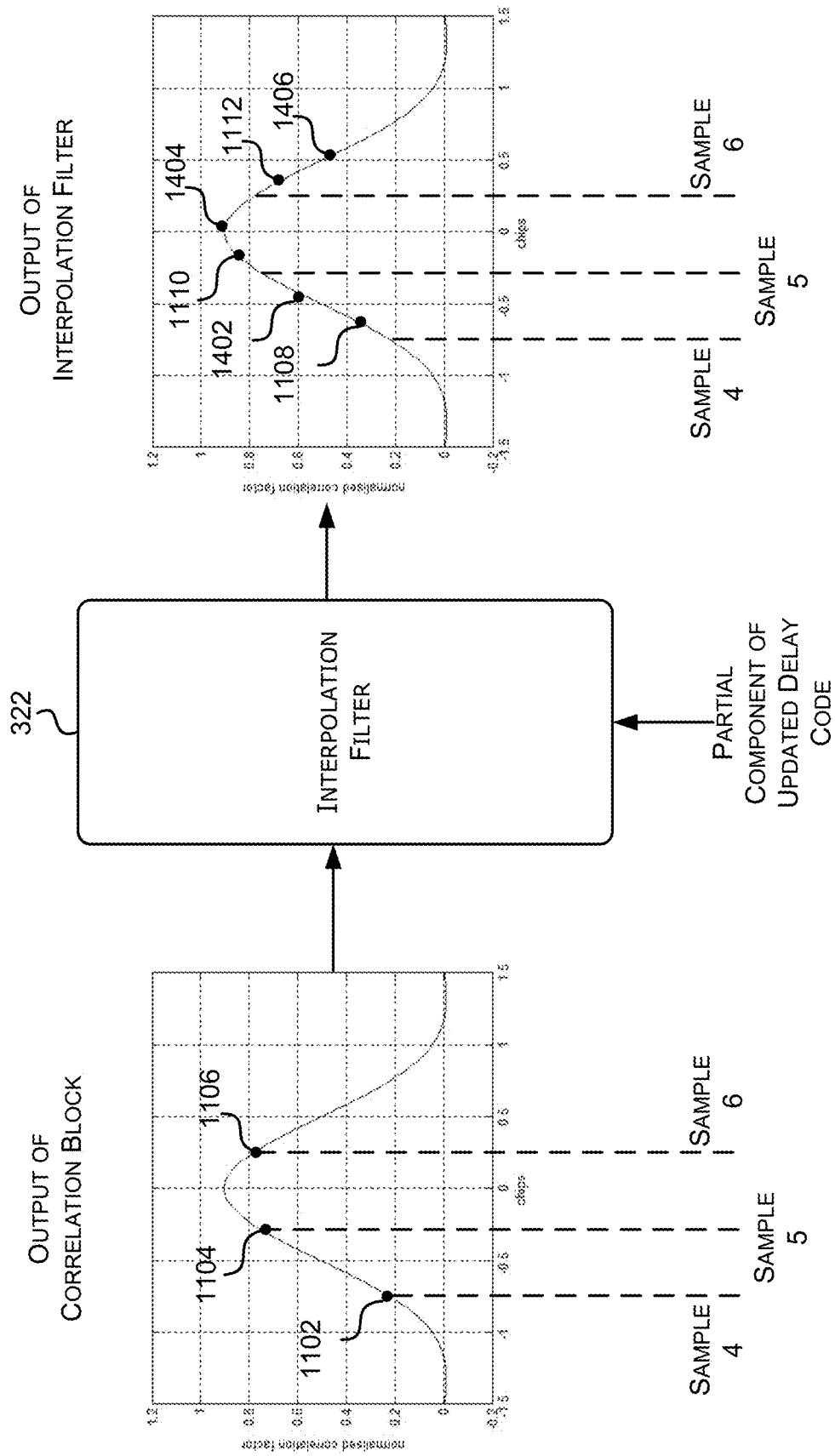
FIG. 14 is a schematic diagram illustrating a second example input and output of the interpolation filter.

In some cases the interpolation filter 322 may be configured to, in addition to generating estimated correlation data points that correspond to offsets that are shifted or re-timed by the fraction of the sample (specified in the partial portion of the estimated code delay) relative to the offsets used by the correlation block 320, generate additional estimated correlation data points that lie between these estimated correlation data points. For example, as shown in FIG. 14, in addition to generating estimated correlation data points 1108, 1110 and 1112 that represent shifted versions of the original correlation data points (those generated by the correlation block 320), the interpolation filter 322 may be configured to generate additional estimated correlation data points 1402, 1404 and 1406 that are between the shifted correlation data points 1108, 1110 and 1112. This may be particularly useful in mitigating multipath interference to give the best performance in the presence of multipath interference.

Accordingly while the interpolation filter 322 is configured to receive N correlation data points from the correlation block 320 the interpolation filter 322 may produce less than N or more than N estimated correlation data points. The number of estimated correlation data points generated by the interpolation filter 322 and the location or offset thereof may be dictated by the configuration of the discriminator block 324. For example, if the code discriminator is configured to implement EML discrimination then the interpolation filter may be configured to only generate two estimated correlation data points representing the early and late offsets with respect to the estimated code delay with a predetermined E-L spacing.

Although FIG. 3 shows the digitization block 312 directly connected to the Doppler removal block 318, in some examples, the output of the digitization block 312 may be stored in memory (not shown), such as random access memory (RAM). This allows the correlation with the local replicas of the corresponding ranging code to be performed more than once to improve the accuracy of the estimate of the code delay. For example, in some cases a first correlation may be performed in accordance with a first estimate of the code delay. This may produce an updated estimate of the code delay and a second correlation may then be performed in accordance with the updated estimate of the code delay.

As is known to those of skill in the art there are two phases of synchronizing to a GNSS signal that are performed by a GNSS receiver—acquisition and tracking. The purpose of the acquisition phase is to identify satellite signals that are visible to receiver and to generate a coarse estimate of the code delay and carrier phase. Typically during the acquisition phase the GNSS receiver has no (or possibly outdated) knowledge of the code delay and carrier phase. Accordingly during the acquisition phase the received signal is correlated with a local replica of the ranging code over a plurality of code delays and for a plurality of carrier phase to identify a coarse estimate of the code delay and carrier phase. For example, in GPS the ranging codes are Gold codes with a period of 1,023 chips transmitted at 1.023 Mbps and thus there are 1023 possible chip offsets for the local replica of the ranging code. The correlation over the different code delays and carrier phases may be performed serially or in parallel.

If a coarse estimate of the code delay and carrier phase can be identified the signal has been "acquired" and the GNSS receiver transitions to the tracking phase. During the tracking phase the code delay and carrier phase are tracked by correlating the received signal with a plurality of local replicas of the corresponding ranging code that each have a different offset with respect to the estimated code delay, such as prompt, early and late ranging codes. Specifically, during the tracking phase the GNSS receiver starts from an estimate of the carrier phase and code delay and merely tracks whether either, or both, of these parameters have shifted.

The ranging code correlation function detection system 304 described herein may be used during the acquisition phase and/or the tracking phase. Specifically, after a coarse estimate of the carrier phase and code delay have been determined the ranging code correlation function detection system described above may be used to obtain a more accurate ranging code correlation function (and thus to generate a more accurate estimate of the code delay) by using the interpolation filter to generate estimated correlation data points based on the coarse estimate of the code delay. Also, it will be evident to a person of skill in the art that the ranging code correlation function detection system described above may be used in the tracking phase to generate an accurate ranging code correlation function to accurately track the code delay and carrier phase.

Figure 15:
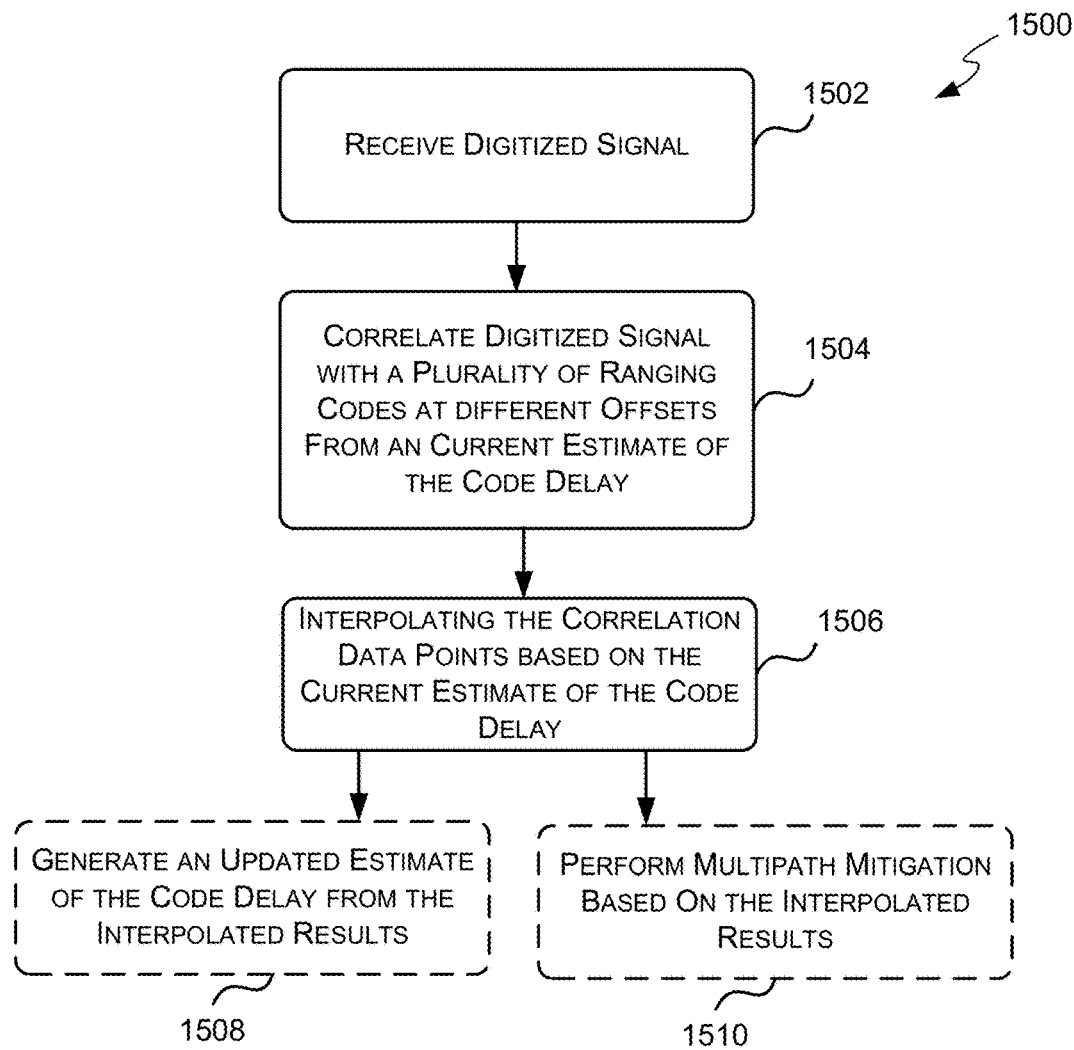
FIG. 15 is a flow chart of an example method for detecting the ranging code correlation function of a GNSS signal.

Reference is now made to FIG. 15 which illustrates an example method 1500 for detecting the ranging code correlation function of a received GNSS signal which may be implemented by the ranging code correlation function detection system. The method 1500 begins at block 1502 where a digitized GNSS signal is received at a sampling rate equal to, or above, the critical sampling rate. As described above, it has been determined that the critical sampling rate for a CDMA GNSS (i.e. a GNSS, such as GPS that uses CDMA to multiplex signals from different satellites) is equal to the bandwidth of the main lobe of the frequency spectrum of the ranging code (e.g. 2 MHz for GPS); and the critical sampling rate for non-CMDA GNSS (e.g. an FDMA GNSS) will be specific to that GNSS (e.g. the critical sampling rate for GLONASS is 9 MHz). See Table 2 for a list of the critical sampling rates for the different GNSSs. Once the digitized GNSS signal has been received, the method 1500 proceeds to block 1504.

At block 1504, the digitized GNSS signal is correlated with each of a plurality of local replicas of the corresponding ranging code each with a different offset from an original estimate of the code delay to produce a plurality of correlation data points. In some cases correlating the digitized GNSS signal with a plurality of local replicates of the corresponding ranging code comprises generating N local replicas of the corresponding ranging code that are offset so as to align with the N samples of the digitized GNSS signal closest to the whole portion of the code delay, and correlating the digitized GNSS signal with each of the N local replicas of the corresponding ranging code to generate N correlation data points. Once the digitized GNSS signal has been correlated with the plurality of local replicas of the corresponding ranging code the method 1500 proceeds to block 1506.

At block 1506, the correlation data points generated at block 1504 are interpolated based on the current estimate of the code delay to generate at least one estimated correlation data point that lies between two of the correlation data points generated in block 1506. Interpolating the correlation data point to generate at least one estimated correlation data point may comprise generating from the correlation data points one or more estimated correlation data points that correspond to offsets that are shifted relative to the original offsets (the offsets used in block 1504) by the fraction of a sample specified by the portion component of the code delay. In some cases interpolating the correlation data points to generate at least one estimated correlation data point may further comprise generating one or more estimated data points that lie between the shifted estimated data points. The number and position (e.g. offset) of the estimated correlation data points may be based on the configuration of the discriminator that generates an updated code delay based on the estimated correlation data points. Once the estimated correlation data points have been generated through interpolation the method 1500 may end or the method 1500 may proceed to block 1508 and/or block 1510.

At block 1508, an updated estimate of the code delay is generated based on the estimated correlation data points generated in block 1506 in accordance with a particular code discriminator. Once the updated estimate of the code delay has been determined the method 1500 may end or the method 1500 may repeat either with a new digitized GNSS signal or with the updated code delay information.

At block 1510, multipath mitigation is performed on the digitized GNSS signal based on the estimated correlation data point generated in block 1506. Once the multipath mitigation is performed the method 1500 may repeat either with a new digitized GNSS signal or with a multipath mitigated version of the signal.

Figure 16:
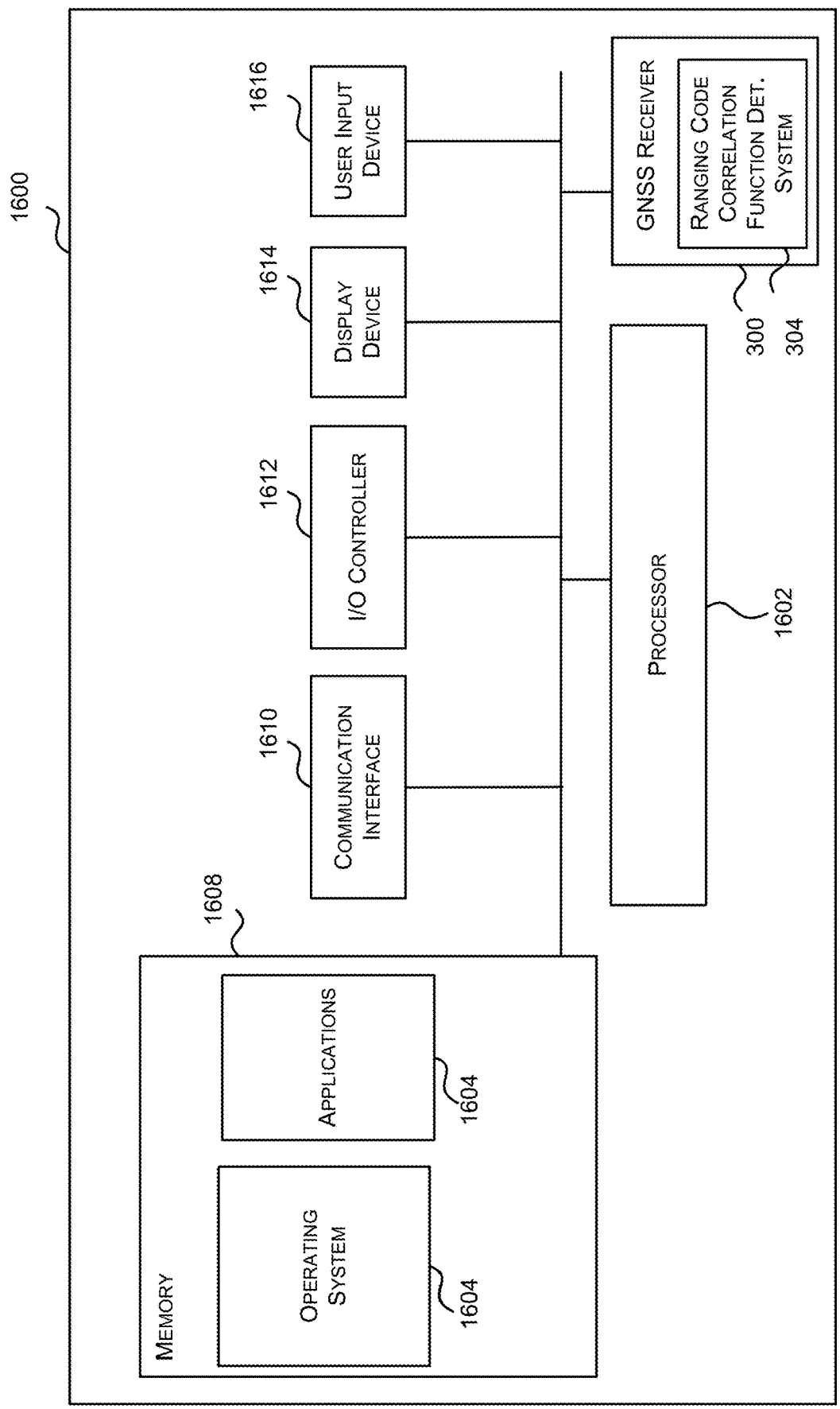
FIG. 16 is a block diagram of an example computing-based device in which the ranging code correlation function detection system may be implemented.

FIG. 16 illustrates various components of an exemplary computing-based device 1600 which may be implemented as any form of a computing and/or electronic device, and in which embodiments of the ranging code correlation function detection systems described herein may be implemented.

Computing-based device 1600 comprises one or more processors 1602 which may be microprocessors, controllers or any other suitable type of processors for processing computer executable instructions to control the operation of the device. In some examples, for example where a system on a chip architecture is used, the processors 1602 may include one or more fixed function blocks (also referred to as accelerators). Platform software comprising an operating system 1604 or any other suitable platform software may be provided at the computing-based device to enable application software 1604 to be executed on the device.

The computer executable instructions may be provided using any computer-readable media that is accessible by computing based device 1600. Computer-readable media may include, for example, computer storage media such as memory 1608 and communications media. Computer storage media (i.e. non-transitory machine readable media), such as memory 1608, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1608) is shown within the computing-based device 1600 it will be appreciated that the storage may be distributed or located remotely and accessed via a network or other communication link (e.g. using communication interface 1610).

The computing-based device 1600 also comprises an input/output controller 1612 arranged to output display information to a display device 1614 which may be separate from or integral to the computing-based device 1600. The display information may provide a graphical user interface. The input/output controller 1612 is also arranged to receive and process input from one or more devices, such as a user input device 1616 (e.g. a mouse or a keyboard). In an embodiment the display device 1614 may also act as the user input device 1616 if it is a touch sensitive display device. The input/output controller 1612 may also output data to devices other than the display device, e.g. a locally connected printing device (not shown in FIG. 16).

The computing-based device 1600 also comprises a GNSS receiver 300 as described herein that comprises a ranging code correlation function detection system 304 as described herein which may provide location and time information to the processor 1602 for use with one or more applications 1604.

The GNSS receiver 300 and the ranging code correlation function detection system 304 of FIG. 3 are shown as comprising a number of functional blocks. This is schematic only and is not intended to define a strict division between different logic elements of such entities. Each functional block may be provided in any suitable manner. It is to be understood that intermediate values described herein as being formed by a block need not be physically generated by the block at any point and may merely represent logical values which conveniently describe the processing performed by the block between its input and output.

The GNSS receivers and the ranging code correlation function detection systems described herein may be embodied in hardware on an integrated circuit. The GNSS receivers and the ranging code correlation function detection systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ranging code correlation function detection system configured to perform any of the methods described herein, or to manufacture a ranging code correlation function detection system comprising any apparatus described herein. An integrated circuit definition dataset may be, for example, an integrated circuit description.

Therefore, there may be provided a method of manufacturing, at an integrated circuit manufacturing system, a ranging code correlation function detection system as described herein. Furthermore, there may be provided an integrated circuit definition dataset that, when processed in an integrated circuit manufacturing system, causes the method of manufacturing a ranging code correlation function detection system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ranging code correlation function detection system will now be described with respect to FIG. 17.

Figure 17:
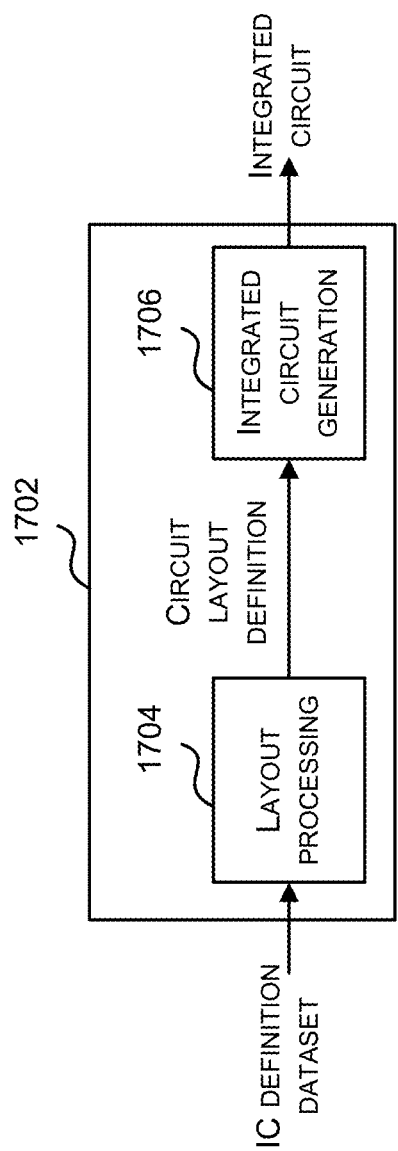
FIG. 17 is a block diagram of an integrated circuit manufacturing system for generating an integrated circuit embodying a ranging code correlation function detection system.

FIG. 17 shows an example of an integrated circuit (IC) manufacturing system 1702 which is configured to manufacture a ranging code correlation function detection system as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a ranging code correlation function detection system as described in any of the examples herein), process the IC definition dataset, and generate an IC according to the IC definition dataset (e.g. which embodies a ranging code correlation function detection system as described in any of the examples herein). The processing of the IC definition dataset configures the IC manufacturing system 1702 to manufacture an integrated circuit embodying a ranging code correlation function detection system as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ranging code correlation function detection system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ranging code correlation function detection system for use in a global navigation satellite system (GNSS) receiver comprising:
    a correlation block configured to correlate a digitized GNSS signal with a corresponding ranging code at each of a plurality of different offsets from a current estimate of a code delay to generate a plurality of correlation data points; and
    an interpolation filter configured to interpolate the plurality of correlation data points based on the current estimate of the code delay to generate at least one estimated correlation data point that lies between two of the correlation data points, wherein the plurality of correlation data points and the at least one estimated correlation data point provide a representation of a ranging code correlation function of the digitized GNSS signal;
    wherein the current estimate of the code delay comprises a whole component specifying a whole number of samples of the digitized GNSS signal and a partial portion specifying a fraction of a sample of the digitized GNSS signal; and
    wherein the interpolation filter is configured to generate the at least one estimated correlation data point by generating an estimated correlation data point that corresponds to an offset that is shifted by the fraction of a sample from one of the different offsets.

2. The ranging code correlation function detection system of claim 1, wherein each of the plurality of different offsets corresponds with a particular sample of the digitized GNSS signal and the at least one estimated correlation data point corresponds to an offset that is between two samples of the digitized GNSS signal.

3. The ranging code correlation function detection system of claim 1, wherein the digitized GNSS signal is at a sampling rate greater than or equal to a critical sampling rate for the GNSS.

4. The ranging code correlation function detection system of claim 3, wherein the digitized GNSS signal is at a sampling rate substantially equal to the critical sampling rate.

5. The ranging code correlation function detection system of claim 3, wherein the GNSS signal is a CDMA GNSS signal and the critical sampling rate is equal to a bandwidth of a main lobe of a frequency spectrum of the corresponding ranging code.

6. The ranging code correlation function detection system of claim 5, wherein the GNSS signal is a GPS signal and the critical sampling rate is substantially 2 MHz, or wherein the GNSS signal is a Galileo signal and the critical sampling rate is substantially 4 MHz, or wherein the GNSS signal is a BeiDou signal and the critical sampling rate is substantially 4 MHz.

7. The ranging code correlation function detection system of claim 1, wherein the critical sampling rate corresponds to two samples per chip of the ranging code or four samples per chip of the ranging code.

8. The ranging code correlation function detection system of claim 3, wherein the GNSS signal is a GLONASS signal and the critical sampling rate is substantially 9 MHz.

9. The ranging code correlation function detection system of claim 1, wherein the interpolation filter is a polyphase finite impulse response interpolation filter.

10. The ranging code correlation function detection system of claim 1, wherein the interpolation filter is a farrow finite impulse response interpolation filter.

11. A GNSS receiver comprising the ranging code correlation function detection system of claim 1.

12. The GNSS receiver of claim 11, further comprising a discriminator block configured to generate an updated estimate of the code delay based on the at least one estimated correlation data point.

13. The GNSS receiver of claim 11, further comprising a multipath mitigation block configured to perform multipath mitigation on the digitized GNSS signal based on the at least one estimated correlation data point.

14. The GNSS receiver of claim 11, further comprising a digitization block configured to receive an intermediate frequency representation of a received GNSS signal and generate the digitized GNSS signal from the intermediate frequency representation of the received GNSS signal.

15. The GNSS receiver of claim 14, wherein the digitization block comprises:
    an analog to digital converter configured to sample the intermediate frequency representation of the received GNSS signal at a first sampling rate; and
    a filter to down-sample an output of the analog to digital converter to generate the digitized signal at a second sampling rate that is lower than the first sampling rate.

16. A method of detecting a ranging code correlation function of a global navigation satellite system (GNSS) signal, the method comprising:
    receiving a digitized GNSS signal;
    correlating the digitized GNSS signal with a corresponding ranging code at each of a plurality of different offsets from a current estimate of a code delay to generate a plurality of correlation data points; and
    interpolating the correlation data points based on the current estimate of the code delay to generate at least one estimated correlation data point that lies between two of the correlation data points, wherein the plurality of correlation data points and the at least one estimated correlation data point provide a representation of a ranging code correlation function of the digitized GNSS signal;

wherein the current estimate of the code delay comprises a whole component specifying a whole number of samples of the digitized GNSS signal and a partial portion specifying a fraction of a sample of the digitized GNSS signal; and wherein interpolating the correlation data points based on the current estimate of the code delay to generate at least one estimated correlation data point comprises generating an estimated correlation data point that corresponds to an offset that is shifted by the fraction of a sample from one of the different offsets.

17. The method of claim 16, wherein each of the plurality of different offsets corresponds with a particular sample of the digitized GNSS signal and the at least one estimated correlation data point corresponds to an offset that is between two samples of the digitized GNSS signal.

18. A non-transitory computer readable storage medium having stored thereon a computer readable dataset description of an integrated circuit that, when processed in an integrated circuit manufacturing system, causes the integrated circuit manufacturing system to manufacture the ranging code correlation function detection system as set forth in claim 1.

19. The ranging code correlation function detection system as set forth in claim 1, wherein the interpolation filter is a polyphase finite impulse response interpolation filter comprising a coefficient lookup table, a linear interpolator and a finite impulse response (FIR) filter, wherein each row of the coefficient lookup table stores a set of coefficients corresponding to a particular fractional sample offset;

wherein the polyphase finite impulse response interpolation filter is configured to use the X most significant bits of the partial portion, wherein X is an integer, to select the two sets of coefficients in the coefficient lookup table corresponding to the offsets that are closest to the fraction of a sample;

wherein the linear interpolator is configured to perform a linear interpolation between the first and second set of coefficients received from the coefficient lookup table based on the remaining bits of the partial portion to generate a final set of coefficients; and wherein the FIR filter is configured to use the final set of coefficients to generate the one or more estimated correlation data points from the correlation data points output by the correlation block.

* * * * *